(12) United States Patent  (10) Patent No.: US 9,226,227 B2
Liu  (45) Date of Patent: Dec. 29, 2015

(54) GROUP BASED BEACONS

(71) Applicant: MARVELL WORLD TRADE LTD., St. Michael (BB)

(72) Inventor: Yong Liu, Campbell, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 97 days.

(21) Appl. No.: 13/931,380

(22) Filed: Jun. 28, 2013

(65) Prior Publication Data

US 2014/0003323 A1   Jan. 2, 2014

Related U.S. Application Data

(60) Provisional application No. 61/666,156, filed on Jun. 29, 2012, provisional application No. 61/680,628, filed on Aug. 7, 2012, provisional application No. 61/700,148, filed on Sep. 12, 2012.

(51) Int. Cl.
H04H 20/71 (2008.01)
G08C 17/00 (2006.01)
H04W 52/02 (2009.01)
H04W 4/08 (2009.01)
H04W 72/04 (2009.01)
H04W 74/00 (2009.01)

(52) U.S. Cl.
CPC ............... *H04W 52/02* (2013.01); *H04W 4/08* (2013.01); *H04W 72/0446* (2013.01); *H04W 74/002* (2013.01)

(58) Field of Classification Search
None
See application file for complete search history.

(56) References Cited

U.S. PATENT DOCUMENTS 7,599,332 B2  10/2009  Zelst et al.
7,742,390 B2   6/2010  Mujtaba
8,144,647 B2   3/2012  Nabar et al.
8,155,138 B2   4/2012  Van Nee
8,289,869 B2  10/2012  Sawai
8,526,351 B2   9/2013  Fischer et al.
8,619,907 B2  12/2013  Mujtaba et al.
8,724,720 B2   5/2014  Srinivasa et al.
(Continued)

FOREIGN PATENT DOCUMENTS

EP  1 315 355 A2  5/2003
EP  2 144 409 A1  1/2010
(Continued)

OTHER PUBLICATIONS

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

(Continued)

*Primary Examiner* — Kiet Tang

(57) ABSTRACT

An access point allocates a plurality of stations among multiple groups, the multiple groups including a first group and a second group. The access point generates a first beacon frame including network information for the first group, and generates a second beacon frame including network information for the second group. The access point transmits the first beacon frame, and transmits the second beacon frame.

12 Claims, 16 Drawing Sheets

(56) References Cited

U.S. PATENT DOCUMENTS

| | | | |
|---|---|---|---|
| 8,867,653 | B2 | 10/2014 | Zhang et al. |
| 8,948,283 | B2 | 2/2015 | Zhang |
| 2003/0133427 | A1 | 7/2003 | Cimini et al. |
| 2004/0218555 | A1 | 11/2004 | Chen et al. |
| 2005/0243782 | A1 | 11/2005 | Sakoda et al. |
| 2006/0092888 | A1 | 5/2006 | Jeong et al. |
| 2007/0274094 | A1 | 11/2007 | Schultz et al. |
| 2009/0196163 | A1 | 8/2009 | Du |
| 2009/0323650 | A1 | 12/2009 | Benveniste |
| 2010/0027519 | A1 | 2/2010 | Chen |
| 2010/0157955 | A1 | 6/2010 | Liu et al. |
| 2010/0265864 | A1* | 10/2010 | He et al. .......... 370/311 |
| 2011/0002219 | A1 | 1/2011 | Kim et al. |
| 2012/0201316 | A1 | 8/2012 | Zhang et al. |
| 2012/0263084 | A1 | 10/2012 | Liu et al. |
| 2012/0294294 | A1 | 11/2012 | Zhang |
| 2012/0314695 | A1 | 12/2012 | Liu |
| 2013/0044687 | A1 | 2/2013 | Liu et al. |
| 2013/0202001 | A1 | 8/2013 | Zhang |
| 2013/0301569 | A1 | 11/2013 | Wang et al. |
| 2013/0329620 | A1* | 12/2013 | Kim et al. ........ 370/311 |
| 2014/0003315 | A1 | 1/2014 | Liu |
| 2014/0003399 | A1 | 1/2014 | Liu |

FOREIGN PATENT DOCUMENTS

| | | |
|---|---|---|
| WO | WO-02/17043 A2 | 2/2002 |
| WO | WO-2012/122119 A1 | 9/2012 |

OTHER PUBLICATIONS

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

Abraham, Santosh, et al., "Short Beacon," The INstitute of Electrical and Electronics Engineers, doc. IEEE 802.11-11/1503r1, 11 pages (Nov. 2011).

Abraham, Santosh, et al., "Short Beacon," *The Institute of Electrical and Electronics Engineers*, doc. IEEE 802.11-12/0129r1, 14 pages (Jan. 2012).

Chen, "Home Network Basis: Transmission Environments and Wired/Wireless Protocols," *Prentice Hall*, pp. 1-26 (Jul. 2003).

Hiertz, et al., "The IEEE 802.11 Universe," *IEEE Communications Magazine*, pp. 62-70, (Jan. 2010).

Liu, et al, "Downlink and Uplink Staggering Techniques with AID Bitmap Segmentation," U.S. Appl. No. 13/477,575, filed May 22, 2012.

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Park, "Proposed Specification Framework for TGah D9.x", *The Institute of Electrical and Electronics Engineers*, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11--yy/xxxxr05, (Jan. 2012).

Park, "Specification Framework for TGah," *The Institute of Electrical and Electronics Engineers*, doc. No. IEEE 802.11-11/1137r13, pp. 1-58 (Jan. 14, 2013).

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Shao, "Channel Selection for 802.11ah," doc.: IEEE 802.11-12/0816r0, pp. 1-11 (Jul. 2012).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

van Nee, et al. "The 802.11n MIMO-OFDM Standard for Wireless LAN and Beyond," Wireless Personal Communications, vol. 37, pp. 445-453 (Jun. 2006).

Vermani, et al. "Preamble Format for 1 MHz," *The Institute of Electrical and Electronics Engineers*, doc. No. IEEE 802.11-11/1482r2, pp. 1-30 (Nov. 2011).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Partial International Search Report in International Application No. PCT/US2013/048638, mailed Oct. 24, 2013 (1 page).

International Search Report and Written Opinion in International Application No. PCT/US2013/048638, mailed Mar. 12, 2014 (16 pages).

International Preliminary Report on Patentability in International Application No. PCT/US2013/048638, mailed Jan. 8, 2015 (13 pages).

Office Action in U.S. Appl. No. 13/931,280, dated Mar. 19, 2015 (14 pages).

Office Action in U.S. Appl. No. 13/931,399, dated Mar. 27, 2015 (19 pages).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Park, "Proposed Specification Framework for TGah", *The Institute of Electrical and Electronics Engineers*, doc. No. IEEE 802.11-11/1137r6, (Mar. 2012).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, 23 pages, Nov. 7, 2001.

IEEE Std 802.11g/D8.2, Apr 2003 (Supplement to ANSI/IEEE Std 802.11, 1999 (Reaff 2003)) "Draft Supplement to Standard [for]

(56) References Cited

OTHER PUBLICATIONS

Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, 69 pages, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and.metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, 91 pages (1999).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

de Vegt, "Potential Compromise for 802.11ah Use Case Document", Institute of Electrical and Electronics Engineers, doc. No. IEEE 802.11-11/0457r0, (Mar. 2011).

Yu, et al. "Coverage extension for IEEE802.11ah," *The Institute of Electrical and Electronics Engineers*, doc. No. IEEE 802.11-11/0035r1, (Jan. 2011).

Taghavi et al., "Introductory Submission for TGah", doc. No. IEEE 802.11-11/0062r0, *Institute for Electrical and Electronics Engineers*, pp. 1-5 (Jan. 14, 2011).

Zhang et al., "11ah Data Transmission Flow," *The Institute of Electrical and Electronics Engineers*, doc. No. IEEE 802.11-11/1484 r1, (Nov. 2011).

Park, "Proposed Specification Framework for TGah D9.x", *The Institute of Electrical and Electronics Engineers*, doc. No. IEEE 802.11-yy/xxxxr0, (Jul. 2012).

Vermani, et al. "Preamble Format for 1 MHz," *The Institute of Electrical and Electronics Engineers*, doc. No. IEEE 802.11-11/1482r2, (Nov. 2011).

Zhang et al., "1MHz Waveform in Wider BW", *The Institute of Electrical and Electronics Engineers*, doc. No. IEEE 802.11-12/0309r1, (Mar. 2012).

Vermani, et al. "Spec Framework Text for PHY Numerology," *The Institute of Electrical and Electronics Engineers*, doc. No. IEEE 802.11-11/1311r0, (Sep. 2011).

Park, "Proposed Specification Framework for TGah", *The Institute of Electrical and Electronics Engineers*, doc. No. IEEE 802.11-11/1137r11, (Sep. 2012).

Office Action in U.S. Appl. No. 13/931,399, dated Oct. 8, 2015 (20 pages).

\* cited by examiner

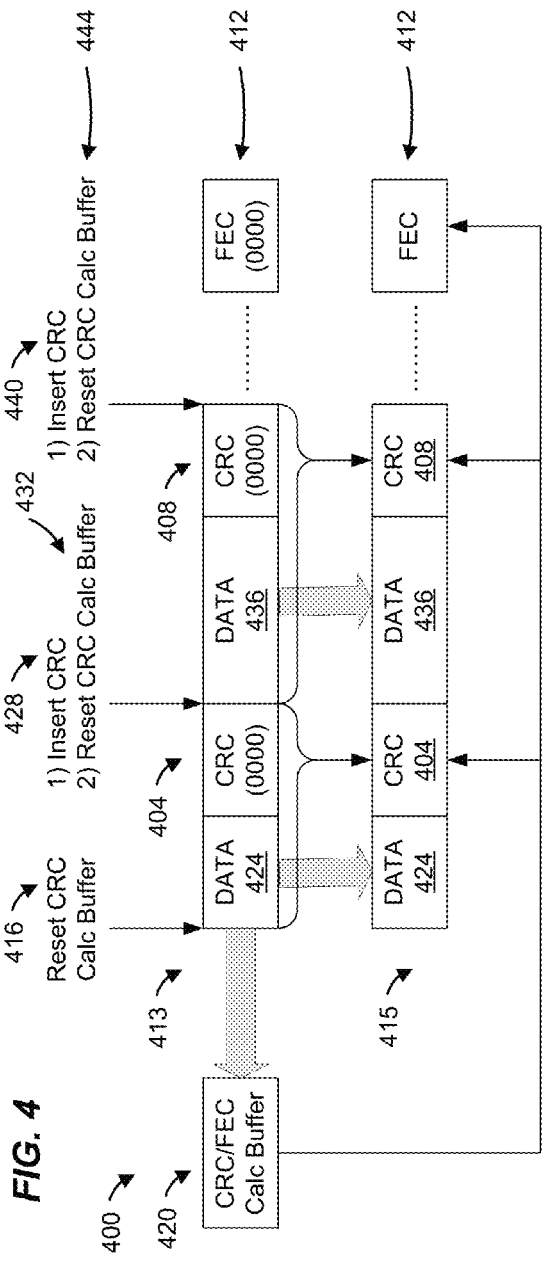
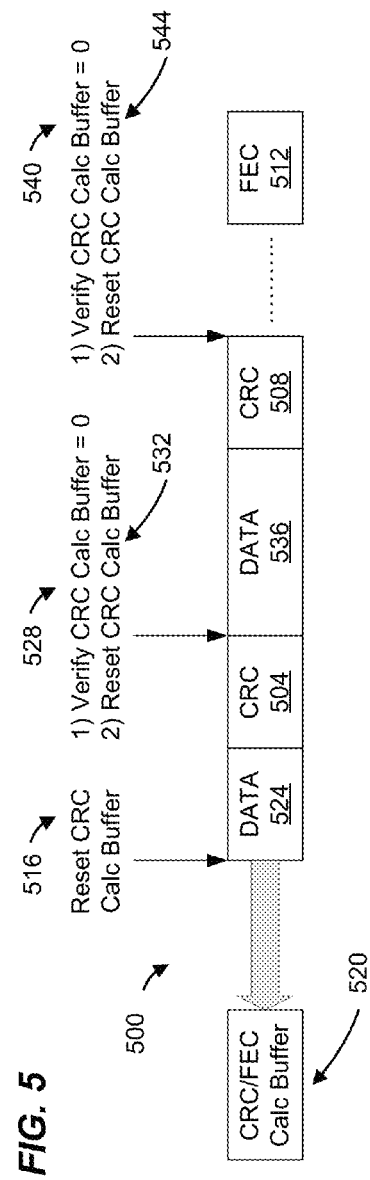
FIG. 4
FIG. 5

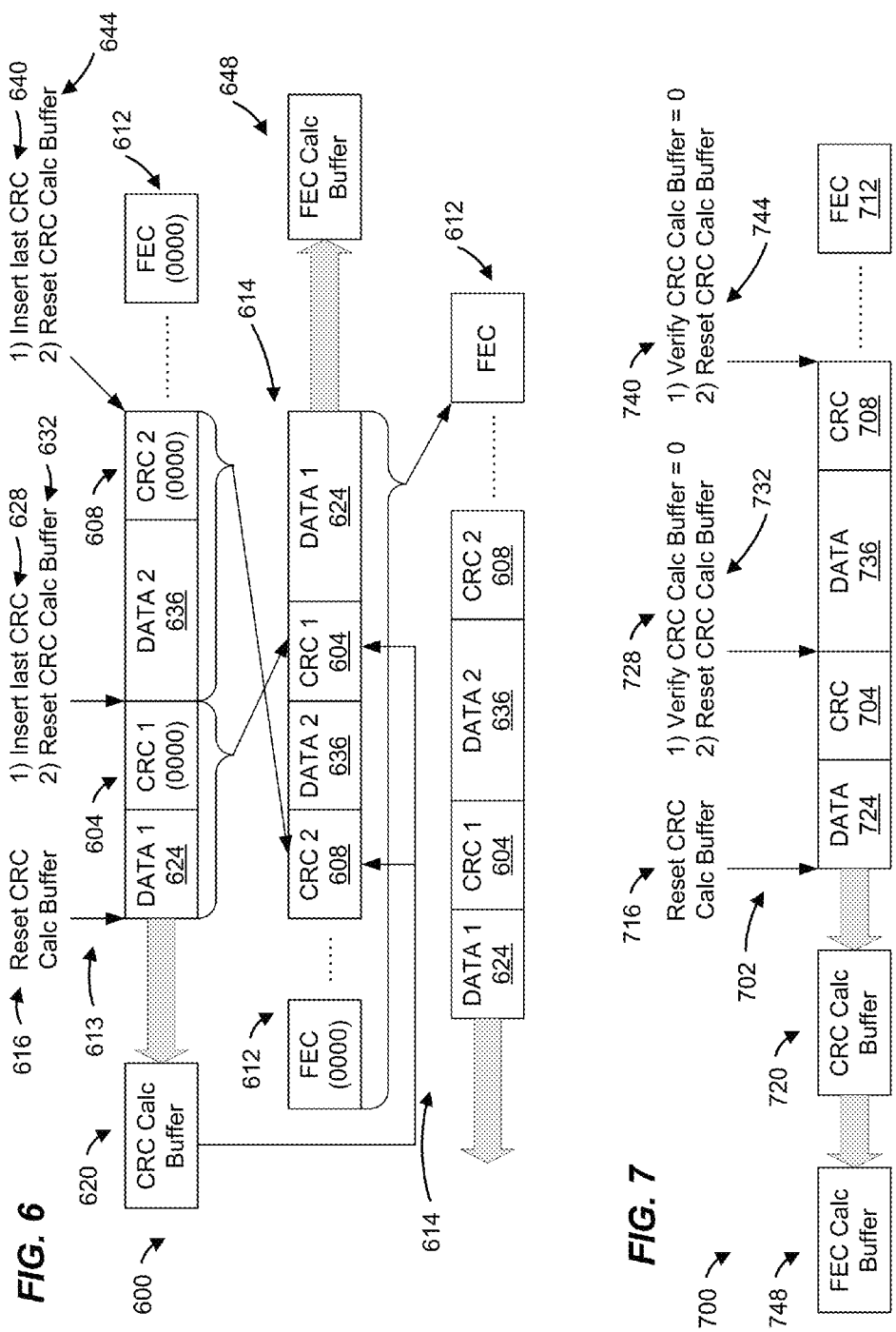

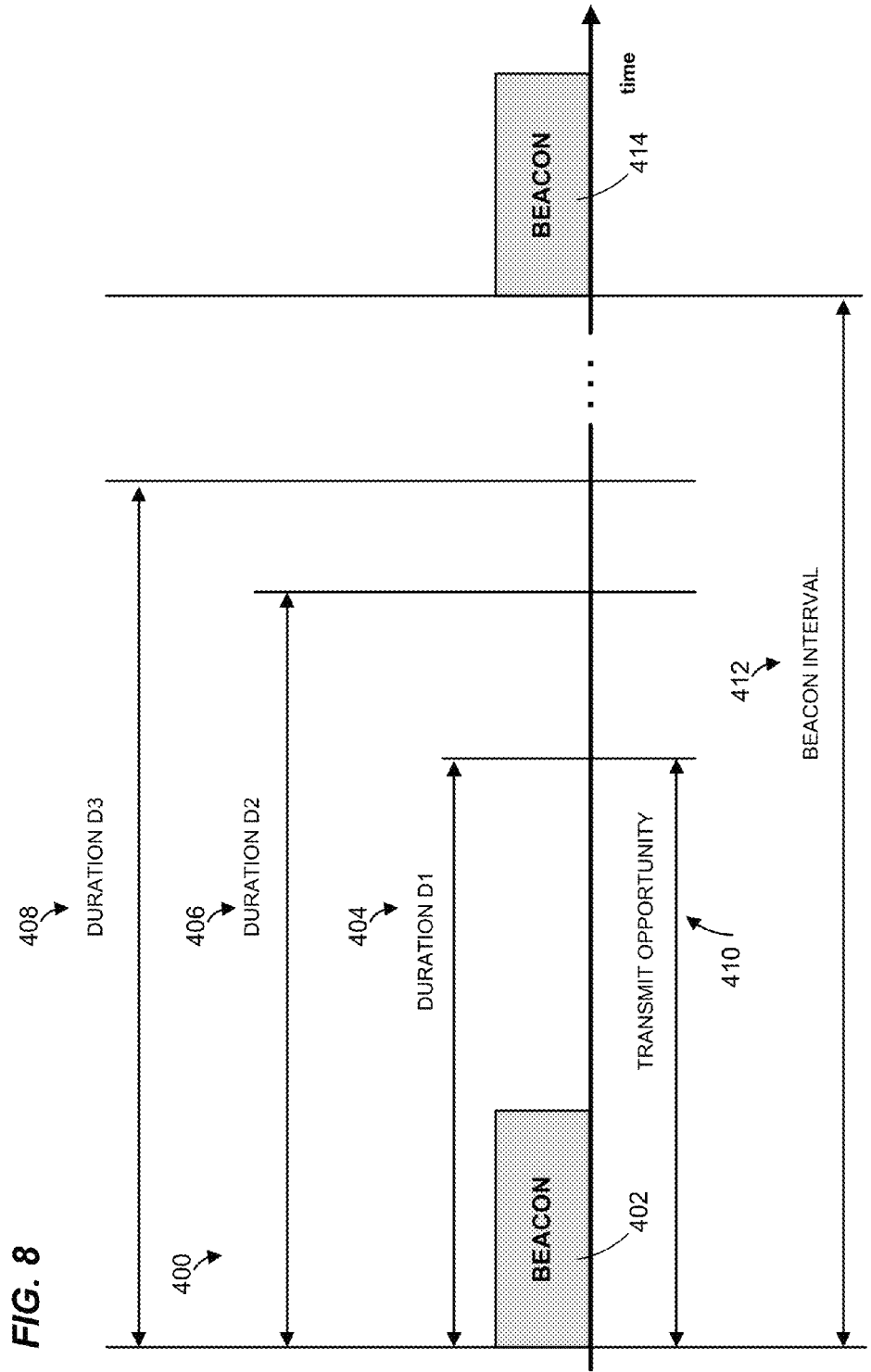

GROUP BASED BEACONS

CROSS-REFERENCES TO RELATED APPLICATIONS

The present application claims the benefit of the following U.S. Provisional Patent Applications:
U.S. Provisional Patent Application No. 61/666,156, entitled "802.11ah Full Beacon Design," filed on Jun. 29, 2012;
U.S. Provisional Patent Application No. 61/680,628, entitled "802.11ah Full Beacon Design," filed on Aug. 7, 2012;
U.S. Provisional Patent Application No. 61/700,148, entitled "802.11ah Full Beacon Design," filed on Sep. 12, 2012.
The disclosures of all of the patent applications referenced above are hereby incorporated by reference herein in their entireties.

Additionally, the present application is related to U.S. patent application Ser. No. 13/931,280, entitled "Unified Beacon Format," filed on the same day as the present application, which is hereby incorporated by reference herein in its entirety.

The present application is also related to U.S. patent application Ser. No. 13/931,399, entitled "Using Duration Field in Beacon to Reserve Channel Time Subsequent to Beacon," filed on the same day as the present application, which is hereby incorporated by reference herein in its entirety.

FIELD OF TECHNOLOGY

The present disclosure relates generally to communication networks and, more particularly, to long range low power wireless local area networks and beacon formats.

BACKGROUND

When operating in an infrastructure mode, wireless local area networks (WLANs) typically include an access point (AP) and one or more client stations (STAs). Wireless local area network (WLAN) technology has evolved rapidly in recent years. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11 ac Standard specifies a single-user peak throughput in the gigabits per second (Gbps) range.

A new standard, IEEE 802.11ah, will specify wireless network operation in sub-1 GHz frequencies. Low frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub-1 GHz range that remain unlicensed, with different specific unlicensed frequencies in different geographical regions. The IEEE 802.11 ah Standard will specify wireless operation in available unlicensed sub-1 GHz frequency bands.

SUMMARY

In an embodiment, a method for transmitting network information for a wireless network includes allocating, at an access point, a plurality of stations among multiple groups, the multiple groups including a first group and a second group. The method also includes generating, at a network interface of the access point, a first beacon frame including network information for the first group, and generating, at the network interface of the access point, a second beacon frame including network information for the second group. The method further includes transmitting, using the network interface device, the first beacon frame, and transmitting, using the network interface device, the second beacon frame.

In another embodiment, an apparatus comprises a network interface configured to implement the method recited above.

In at least some embodiments, utilizing group-based beacons provides any combination of one or more of the following benefits. A beacon corresponding to a particular group omits unnecessary information specific to other groups. Thus, a communication device that processes such a group-specific beacon may consume less power because, at least in some scenarios, the communication device need not process such unnecessary information and/or the communication device can enter a low power mode more quickly. Also, communication devices not belonging to the group need not further process the group specific beacon, and the communication devices not belonging to the group can thus enter a low power mode more quickly.

BRIEF DESCRIPTION OF THE DRAWINGS

FIG. 4 is a diagram illustrating generation, at a transmitter, of error detection data for a beacon frame, according to an embodiment.

FIG. 5 is a diagram illustrating generation, at a receiver, of error detection data for a beacon frame, according to an embodiment.

FIG. 6 is a diagram illustrating generation, at a transmitter, of error detection data for a beacon frame, according to another embodiment.

FIG. 7 is a diagram illustrating generation, at a receiver, of error detection data for a beacon frame, according to another embodiment.

FIG. 8 is a timing diagram illustrating examples of reserved time periods that exceed a length of a beacon frame, according to an embodiment.

DETAILED DESCRIPTION

In embodiments described below, a wireless network device such as an access point (AP) of a wireless local area network (WLAN) transmits data streams to one or more client stations (or "STAs," using IEEE 802.11 terminology). The AP is configured to operate with client STAs according to a communication protocol. In an embodiment, the communication protocol defines operation in a sub-1 GHz frequency range, and is typically used for applications requiring long range wireless communication with relatively low data rates. The communication protocol (e.g., IEEE 802.11ah) is referred to herein as a "long range" communication protocol. In some embodiments, power efficiency is of particularly high importance, such as sensor network applications using the long range communication protocol.

In some embodiments, the long range communication protocol defines medium access control (MAC) layer control frame formats and physical (PHY) layer control frame formats that are similar to control frame formats defined by the current IEEE 802.11 Standard. However, the current IEEE 802.11 control frame formats may require STAs and APs to conduct unnecessary processing of packets, or portions of packets, resulting in higher power consumption. In some embodiments, some aspects of a control frame format are altered relative to the current IEEE 802.11 format to reduce packet processing time for long range transmission defined by the long range communication protocol. Additionally or alternatively, in some embodiments, the techniques described below reduce the overhead associated with transmission of packets. Further, in some embodiments, the techniques described below modify frame exchange sequences to reduce power consumption in at least some devices operating according to the long range communication protocol.

Figure 1:
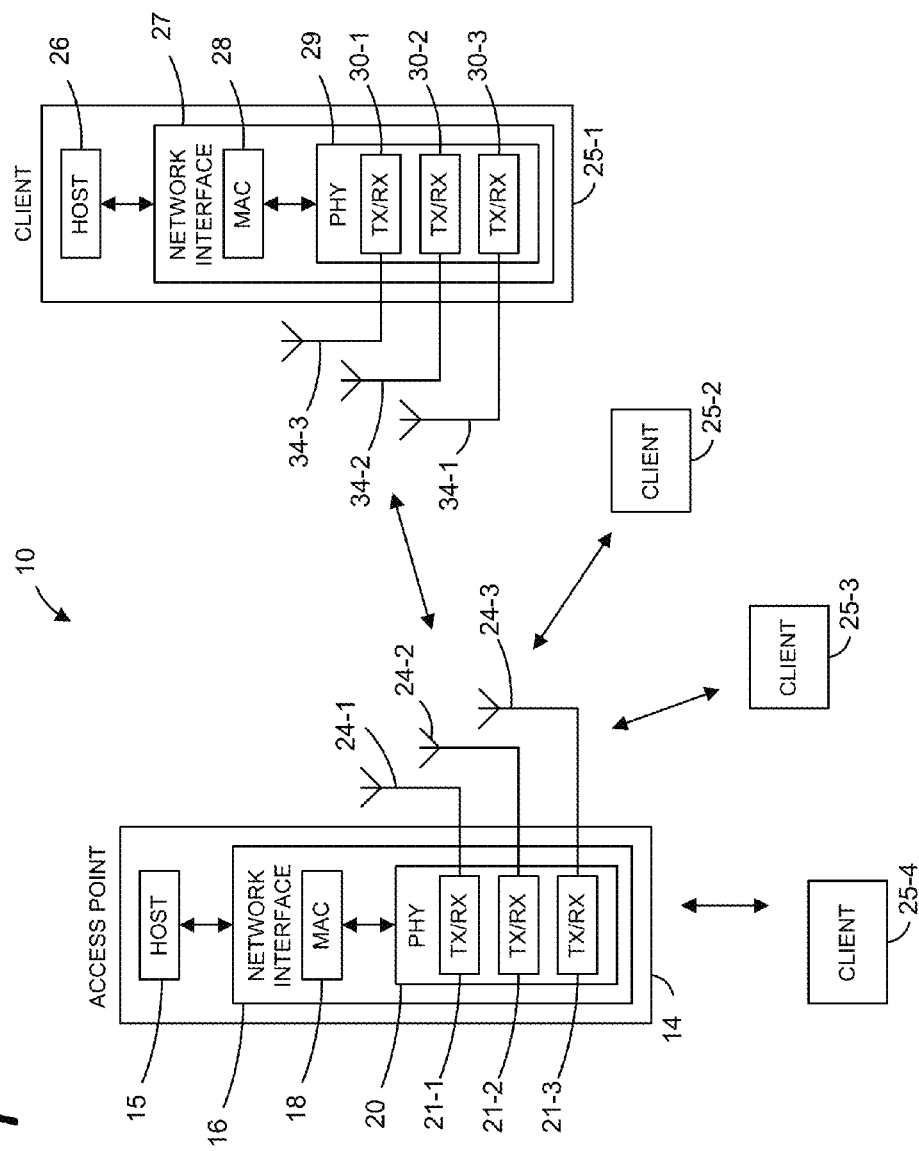
FIG. 1 is a block diagram of an example wireless local area network (WLAN), according to an embodiment.

FIG. 1 is a block diagram of an example WLAN 10 including an AP 14, according to an embodiment. The AP 14 includes a host processor 15 coupled to a network interface 16. The network interface 16 includes a MAC processing unit 18 and a PHY processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client STAs 25. Although four client STAs 25 are illustrated in FIG. 1, the WLAN 10 can include different numbers (e.g., 1, 2, 3, 5, 6, etc.) of client STAs 25 in various scenarios and embodiments. The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client STAs 25-2, 25-3, and 25-4 has/have a structure the same as or similar to the client station 25-1. In these embodiments, the client STAs 25 that are structured the same as or similar to the client station 25-1 have the same or a different number of transceivers and antennas. For example, the client station 25-2 has only two transceivers and two antennas (not shown), according to an embodiment.

In an embodiment, the PHY processing unit 20 of the AP 14 is configured to generate packets conforming to the long range communication protocol, and the transceiver(s) 21 is/are configured to transmit the generated packets via the antenna(s) 24. Moreover, the PHY processing unit 20 of the AP 14 is configured to process received packets conforming to the long range communication protocol, in an embodiment. The packets are received by the transceiver(s) 21 via the antenna(s) 24.

In an embodiment, the PHY processing unit 29 of the client device 25-1 is also configured to generate packets conforming to the long range communication protocol, and the transceiver(s) 30 is/are configured to transmit the generated packets via the antenna(s) 34. Moreover, the PHY processing unit 29 of the client device 25-1 is configured to process received packets conforming to the long range communication protocol, in an embodiment. The packets are received by the transceiver(s) 30 via the antenna(s) 34.

Figure 2:
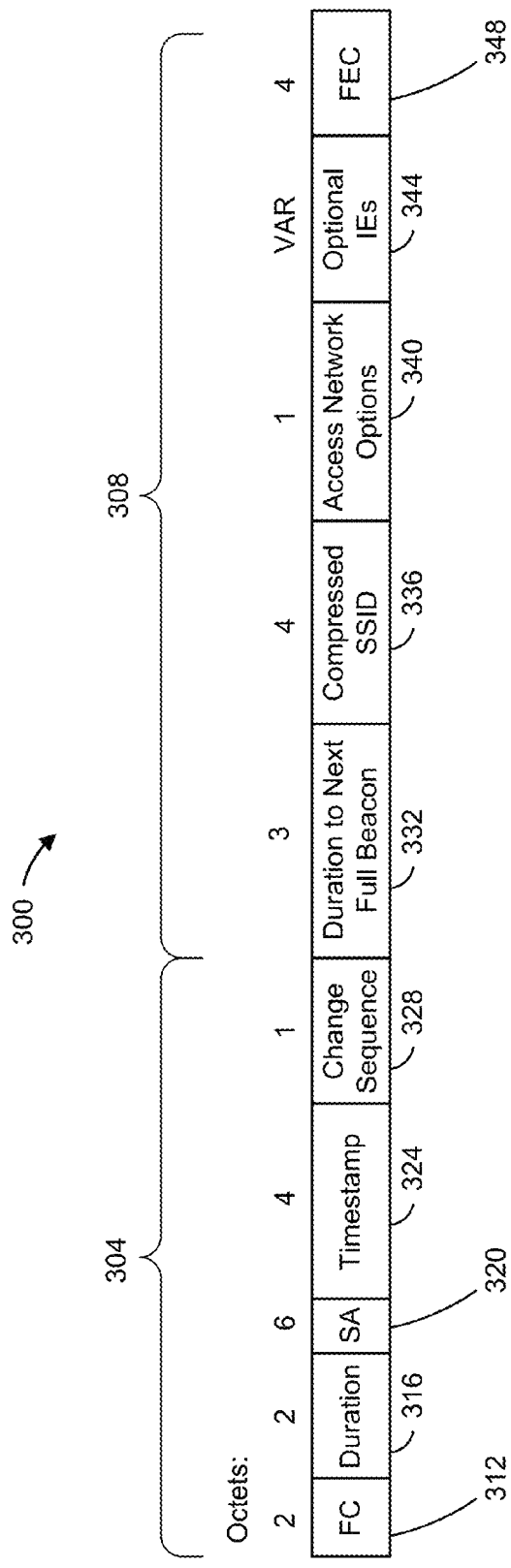
FIG. 2 is a diagram of an example unified beacon format, according to an embodiment.

FIG. 2 is block diagram of an example format of a beacon frame 300, according to an embodiment. The beacon frame 300 is transmitted by an AP to provide network information to stations (STAs) within a basic service set (BSS), in an embodiment. In an embodiment, the beacon frame 300 conforms to one of two general subformats: a short beacon subformat and a full beacon subformat. Short beacons (conforming to the short beacon subformat) are transmitted by the AP more frequently (as compared to full beacons conforming to the long beacon subformat), in some embodiments and/or scenarios, and are shorter (as compared to the full beacon subformat) to reduce channel overhead and/or to reduce the amount of time required of a STA to process short beacons, in some embodiments. Full beacons are transmitted by the AP less frequently (as compared to short beacons), in some embodiments and/or scenarios, and are longer (as compared to the short beacon subformat) to provide more network information (e.g., to STAs not yet associated with the AP), in some embodiments. In some embodiments, short beacons are intended to provide network information to STAs already associated with the AP, whereas full beacons are intended to provide network information to STAs not yet associated with the AP and/or to provide network information, which has changed, to STAs. All beacon frames generated and transmitted by the AP conform to the beacon format 300, at least in some embodiments. A network interface (such as the network interface 16) is configured to generate beacon frames according to the unified beacon frame format 300, in an embodiment.

The beacon format 300 includes a first portion 304 that is the same between the short beacon subformat and the full beacon subformat, in an embodiment. The first portion 304 is a set of multiple contiguous fields, in an embodiment. The first portion 304 occurs at a beginning of the beacon frame 300, in an embodiment. The beacon frame 300 is a MAC layer frame, and physical layer (PHY) preamble and/or header fields (not shown) precede the first portion 304 when transmitted, in an embodiment.

The beacon format 300 also includes a second portion 308 that varies depending on whether the short beacon subformat or the full beacon subformat is being utilized, in an embodiment. For example, the second portion 308 includes more information when the full beacon subformat is utilized as compared to when the short beacon subformat is utilized.

The first portion 304 includes a frame control (FC) field 312, a duration field 316, a source address (SA) field 320, a timestamp field 324, and a change sequence field 328, in an embodiment. The duration field 316 indicates a duration of the beacon frame 300, in an embodiment. As described in more detail below, in some embodiments, the duration field 316 is set to a value longer than the duration of the beacon frame in order to reserve a communication channel for transmissions subsequent to the beacon frame 300. The change sequence field 328 indicates whether BSS information has changed and thus whether a STA should process other fields of the beacon frame 300 to determine what BSS information has changed, in an embodiment.

The second portion 308 includes zero, one, or more of (i) a field 332 to indicate a duration until a next beacon, (ii) a field 336 to include a compressed service set identifier (SSID) (e.g., a shortened version of a full SSID, a truncated SSID, etc.), (iii) an access network options field 340, (iv) a field 344 to include zero, one, or more information elements (IEs), and (v) a forward error correction (FEC) field 348. The content of the second portion 308 changes depending on whether the beacon is a full beacon or a short beacon, in an embodiment. Thus, in some embodiments, one or more of the fields in the portion 308 are included in a full beacon but omitted from a short beacon.

In an embodiment, the field 332 is omitted altogether from the beacon format 300. In another embodiment, the field 332 included in the short beacon subformat but omitted in the full beacon subformat.

In some embodiments, while the full beacon is longer than the short beacon (e.g., because of more IEs 344 included in the full beacon as compared to the short beacon), one or more of the fields 332, 336, and 340 are omitted in the full beacon but included in the short beacon. In an embodiment, the compressed SSID field 336 is included in the short beacon subformat but omitted in the full beacon subformat. For example, in an embodiment, a full SSID is included as an IE in the field 344 in the full beacon subformat instead of including the compressed SSID field 336 in the full beacon subformat. Similarly, the full SSID is omitted in the field 344 in the short beacon subformat and instead the compressed SSID field 336 is included in the short beacon subformat.

In an embodiment, the access network options field 340 is included in the short beacon subformat but omitted in the full beacon subformat. For example, in an embodiment, an interworking IE is included in the IEs field 344 in the full beacon subformat instead of including the access network options field 340 in the full beacon subformat. Similarly, the interworking IE is omitted in the IEs field 344 in the short beacon subformat and instead the access network options field 340 is included in the short beacon subformat.

In some embodiments, the full beacon subformat carries sufficient information elements in the field 344 to indicate a full BSS information.

In an embodiment, the first portion 304 includes only a single address field (e.g., SA field 320), whereas prior art full beacons include multiple address fields. Limiting the number of address fields to one in the first portion 304 helps reduce channel overhead and/or reduce the amount of time required of a STA to process the beacon 300, in some embodiments.

In an embodiment, the full beacon subformat is indicated by the Duration to Next Full Beacon field 332. For example, the full beacon is indicated by setting the Duration to Next Full Beacon field 332 to a pre-determined value (e.g., zero or another suitable value). In an embodiment, when the Duration to Next Full Beacon field 332 is not set to the pre-determined value, this indicates to a receiver that the beacon conforms to the short beacon subformat. In another embodiment, the FC 312 includes a subfield (not shown) to indicate whether the beacon conforms to the full beacon format or the short beacon format. For example, in an embodiment, a first predetermined value in the subfield of the FC 312 indicates the full beacon subformat, whereas a second predetermined value in the subfield of the FC 312 indicates the short beacon subformat. In another embodiment, a service field (not shown) in the first portion 304 includes a subfield (not shown) to indicate whether the beacon conforms to the full beacon format or the short beacon format. For example, in an embodiment, a first predetermined value in the subfield of the service field indicates the full beacon subformat, whereas a second predetermined value in the subfield of the service field indicates the short beacon subformat.

In an embodiment, a field in a PHY header or PHY preamble (not shown) (e.g., a signal SIG field) includes a subfield (not shown) to indicate whether the beacon conforms to the full beacon format or the short beacon format. For example, in an embodiment, a first predetermined value in the subfield in the PHY header indicates the full beacon subformat, whereas a second predetermined value in the subfield in the PHY header indicates the short beacon subformat.

A STA can receive a beacon frame, such as described above, and determine whether the beacon frame conforms to the full beacon format or the short beacon format. Then, the STA processes the beacon frame accordingly. For example, the STA determines, based on an indicator (i) in the beacon frame or (ii) in the PHY header, whether the beacon frame has a short beacon format or a full beacon format. The STA processes a first portion of the beacon frame (e.g., portion 304), where the first portion has the same format whether the beacon frame has (i) the short beacon format or, (ii) the full beacon format. When the STA determines that the beacon frame has the short beacon format, the STA processes a second portion of the beacon frame (e.g., portion 308) according to the short beacon format. When the STA determines that the beacon frame has the full beacon format, the STA processes the second portion of the beacon frame according to the full beacon format. The STA determines network information communicated by the AP based on (i) the processing of the first portion, and (ii) the processing of the second portion.

Figure 3A:
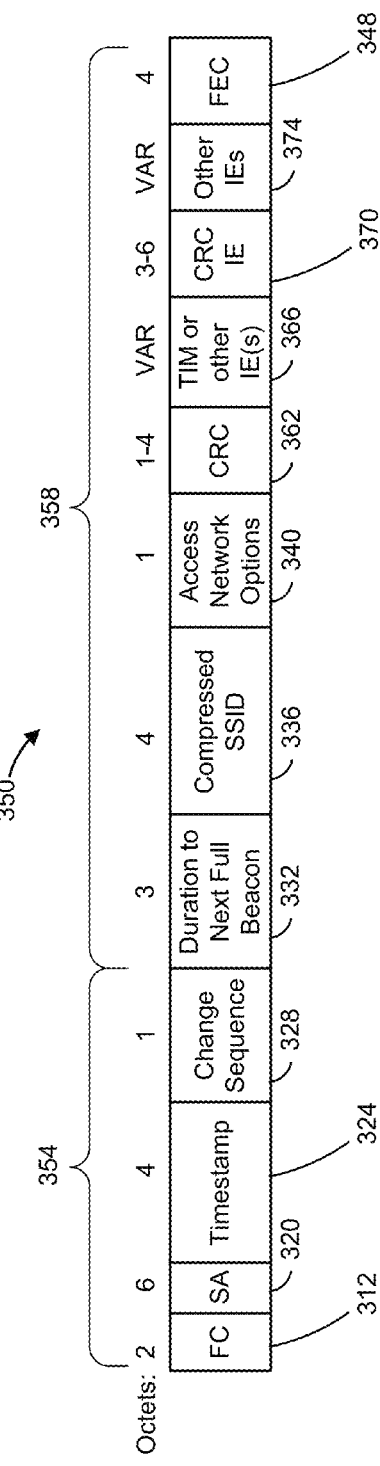
FIG. 3A is a diagram of another example unified beacon format, according to another embodiment.

In some embodiments and/or scenarios, it is beneficial to permit a STA to process only a portion of a beacon to save processing time and/or power consumption, for example. In some embodiments, one or more error detection information fields are included in the beacon frame to enable receiving stations to verify relevant fields and skip other fields if not needed (e.g., to allow a station to go to sleep sooner for power saving). FIG. 3A is a diagram of an example uniform beacon frame format 350 according to an embodiment. A network interface (such as the network interface 16) is configured to generate beacon frames according to the unified beacon frame format 350, in an embodiment.

The uniform beacon frame format 350 is similar to the uniform beacon frame format 300 of FIG. 2, and like-numbered elements are not discussed in detail for purposes of brevity.

The uniform beacon frame format 350 includes a first portion 354 and a second portion 358 similar to the first portion 304 and the second portion 308 discussed with reference to FIG. 2. The beacon format 350 omits the duration field 316 from the first portion 304, in an embodiment.

The beacon frame 350 includes a cyclic redundancy check (CRC) field 362. The CRC field 362 is generated using all fields shown to the left of the CRC field 363 in FIG. 3A so that a receiver can utilize the CRC field 362 to verify the integrity of fields shown to the left of the CRC field 363 in FIG. 3A and analyze information in the fields shown to the left of the CRC field 363 in FIG. 3A without having to process other later portions of the beacon frame 350. Thus, in some situations, a receiving station can stop processing the remainder of the frame 350 when it determines, after analyzing fields shown to the left of the CRC field 362 in FIG. 3A, that the station need not process further fields in the frame 350.

The beacon frame 350 also includes a traffic indication map (TIM) field 366 (and/or other IEs) and a CRC field 370. The CRC field 370 is generated using the TIM field 366 (and/or other IEs) so that a receiver can utilize the CRC field 370 to verify the integrity of the TIM field 366 (and/or other IEs), and analyze information in the TIM field 366 (and/or other IEs) without having to process other portions of the beacon frame 350 shown to the right of the CRC field 370 in FIG. 3A. Thus, in some situations, a receiving station can stop processing the remainder of the frame 350 when it determines, after analyzing the TIM field 366, that the station does not need to further process the frame 350. For example, if a receiving station determines, from the TIM field 366, that the AP does not have buffered data for the station, the receiving station may stop processing the remainder of the frame 350. In an embodiment, the CRC field 370 is generated also using fields shown to the left of the TIM field 366 in FIG. 3A.

The beacon frame 350 also includes other fields and/or elements 374. In an embodiment, the FEC field 348 is generated using only the fields 374 and without using fields to the left of the fields 374. In another embodiment, the FEC field 348 is generated also using the fields to the left of the fields 374.

In embodiments in which a network interface of a receiver decides to stop further processing of the frame 350, the network interface may enter a sleep mode for the remainder of the frame 350 to reduce energy consumption. For instance, if a STA need not process TIM information, the STA may skip processing the TIM field 366 and all following information elements. In another example, if the change sequence field 328 of a beacon indicates there is no BSS update for an STA, then the STA may stop processing the beacon frame 350.

In some embodiments, having a CRC field such as the CRC field 362, the CRC field 363 is calculated based on all the media access control (MAC) fields before the CRC field 362 (e.g., shown to the left of the CRC field 362 in FIG. 3A). In some embodiments, the MAC fields before the CRC field 362 include a service field. In some embodiments, a format of the CRC field 363 is a short format, e.g., one octet (8 bits). In some embodiments, a length of the CRC field 363 is the same as the length of the forward error correction (FEC) field 348, e.g., 4 octets. In other embodiments, the CRC field 363 has another suitable length.

In various embodiments, a length of the CRC field 370 is 3 octets, 4 octets, 5 octets, or 6 octets. In other embodiments, the CRC field 363 has another suitable length.

In some embodiments, the CRC field 362 is omitted. In some embodiments, the CRC field 370 is omitted.

Figure 3B:
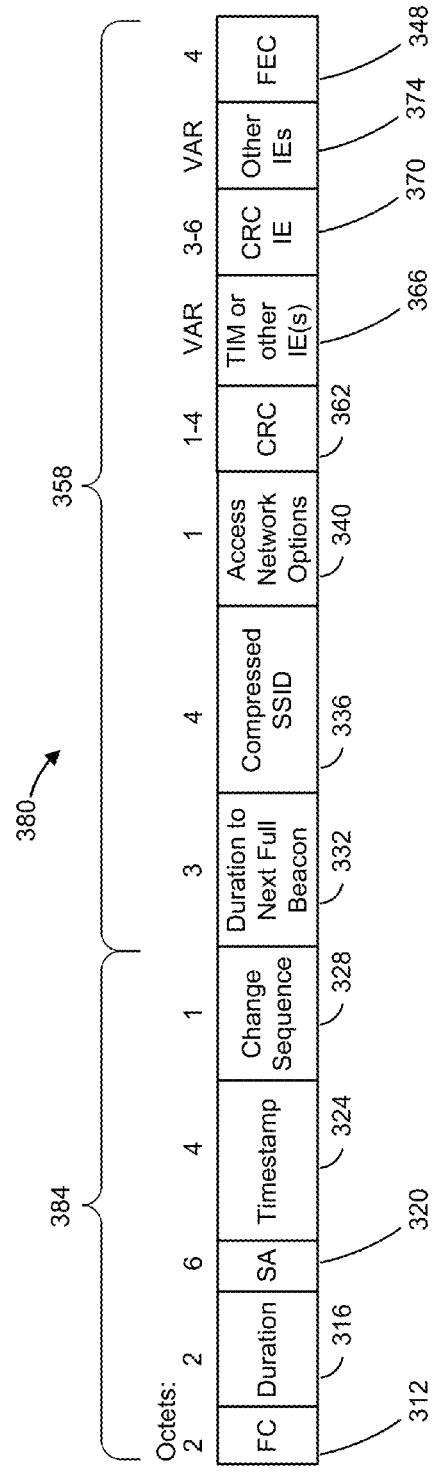
FIG. 3B is a diagram of another example unified beacon format, according to another embodiment.

FIG. 3B is a diagram of another example uniform beacon frame format 380 according to another embodiment. A network interface (such as the network interface 16) is configured to generate beacon frames according to the unified beacon frame format 380, in an embodiment.

The uniform beacon frame format 380 is similar to the uniform beacon frame format 300 of FIG. 2 and the uniform beacon frame format 350 of FIG. 3A, and like-numbered elements are not discussed in detail for purposes of brevity.

The uniform beacon frame format 350 includes a first portion 384 and a second portion 358 similar to the first portion 304 and the second portion 308 discussed with reference to FIG. 2. The first portion 384 is similar to the first portion 354 of FIG. 3A, but includes the duration field 316.

FIG. 4 is a diagram illustrating calculating and inserting multiple CRCs in a frame, such as the beacon frame 350, the beacon frame 380, or another suitable beacon frame, according to an embodiment. In an embodiment, a single error detection (or correction, in some embodiments) calculation module calculates early CRCs 404, 408 (e.g., CRCs 362, 370 of FIGS. 3A, 3B) and FEC field 412 (e.g., FEC field 348 of FIGS. 3A, 3B). In the embodiment illustrated in FIG. 4, early CRC 408 is calculated based on the bits starting from (but excluding) the end of the last early CRC 404 (if present) until the end of the CRC field 408. The FEC 412 is calculated based on the bits starting from (but excluding) the end of the early CRC 408 (if present) until the end of the FEC 412. A network interface (such as the network interface 16) is configured to perform the processing illustrated in FIG. 4, in an embodiment. In an embodiment, FIG. 4 illustrates processing performed at an AP when generating a beacon frame. FIG. 4 is described in the context of the AP performing the processing for illustrative purposes, but in other embodiments a STA performs the processing illustrated in FIG. 4.

FIG. 4 illustrates a beacon frame 413 prior to calculation of CRCs 404, 408, and FEC 412, and a beacon frame 415 after calculation and insertion of the CRCs 404, 408 and FEC 412.

At a step 416, the AP resets a shared CRC/FEC calculation buffer 420. The CRC/FEC calculation buffer 420 is used to calculate and house calculated CRC and FEC values before they are inserted into the beacon frame for transmission. After resetting the CRC/FEC calculation buffer 420, the CRC/FEC calculation buffer 420 is used to store interim CRC calculation results based on processing data 424. After the data 424 is completely processed, the CRC/FEC calculation buffer 420 will hold a first calculated CRC result. The first calculated CRC stored in the buffer 420 is then inserted into CRC field 404 of the beacon frame 415 at step 428. Additionally, the CRC calculation buffer 420 is reset at step 432.

Then, the CRC/FEC calculation buffer 420 is used to store interim CRC calculation results based on processing data 436. After the data 436 is completely processed, the CRC/FEC calculation buffer 420 will hold a second calculated CRC result. The second calculated CRC stored in the buffer 420 is then inserted into CRC field 408 of the beacon frame 415 at step 440. Additionally, the CRC calculation buffer 420 is reset at step 444.

Then, the CRC/FEC calculation buffer 420 is used to store interim FEC calculation results based on processing data subsequent to the CRC field 408. After the data subsequent to the CRC field 408 is completely processed, the CRC/FEC calculation buffer 420 will hold a calculated FEC result. The calculated FEC result stored in the buffer 420 is then inserted into FEC field 412 of the beacon frame 415.

FIG. 5 is a diagram illustrating receiver-side CRC processing 500 when a frame 502 includes multiple CRCs, such as the beacon frame 350, the beacon frame 380, or another suitable beacon frame, according to an embodiment. In an embodiment, a single error detection (or correction, in some embodiments) calculation module performs CRC processing corresponding to early CRCs 504, 508 (e.g., CRCs 362, 370 of FIGS. 3A, 3B) and FEC field 512 (e.g., FEC field 348 of FIGS. 3A, 3B). In the embodiment illustrated in FIG. 5, first CRC processing corresponding to CRC field 504 is performed using bits at the beginning of a frame 502 through the CRC field 504. In an embodiment, second CRC processing corresponding to the CRC field 508 is performed using bits starting from (but excluding) the end of the last early CRC 504 (if present) through the CRC field 508. FEC processing corresponding to the FEC field 512 is performed using bits starting from (but excluding) the end of the early CRC 508 (if present) through the FEC field 512. A network interface (such as the network interface 27) is configured to perform the processing illustrated in FIG. 5, in an embodiment. In an embodiment, FIG. 5 illustrates processing performed at a STA when processing a beacon frame. FIG. 5 is described in the context of a STA performing the processing for illustrative purposes, but in other embodiments an AP performs the processing illustrated in FIG. 5.

At a step 516, the STA resets a shared CRC/FEC calculation buffer 520. The CRC/FEC calculation buffer 520 is used to calculate and house CRC and FEC calculation values. After resetting the CRC/FEC calculation buffer 520, the CRC/FEC calculation buffer 520 is used to store interim and final CRC calculation results based on processing data 524. After the data 524 and the CRC field 504 are completely processed, the CRC/FEC calculation buffer 520 will hold a first calculated CRC result. The first calculated CRC stored in the buffer 520 is then compared to zero at step 528. When the first calculated CRC equals zero, this indicates no errors occurred in the data 524. Additionally, the CRC calculation buffer 520 is reset at step 532.

Then, the CRC/FEC calculation buffer 520 is used to store interim CRC calculation results based on processing data 536. After the data 536 and the CRC field 508 are completely processed, the CRC/FEC calculation buffer 520 will hold a second calculated CRC result. The second calculated CRC stored in the buffer 520 is then compared to zero at step 540. When the second calculated CRC equals zero, this indicates no errors occurred in the data 536. Additionally, the CRC calculation buffer 520 is reset at step 544.

Then, the CRC/FEC calculation buffer 520 is used to store interim FEC calculation results based on processing data subsequent to the CRC field 508. After the data subsequent to the CRC field 508 and the FEC field 512 is completely processed, the CRC/FEC calculation buffer 520 will hold an FEC result. The FEC result stored in the buffer 520 is then compared to zero. When the FEC result equals zero, this indicates no errors occurred in the data subsequent to the CRC field 508.

FIG. 6 is a diagram illustrating calculating and inserting multiple CRCs in a frame, such as the beacon frame 350, the beacon frame 380, or another suitable beacon frame, according to another embodiment. In an embodiment, a first error detection (or correction, in some embodiments) calculation module calculates early CRCs 604, 608 (e.g., CRCs 362, 370 of FIGS. 3A, 3B), a second error detection (or correction, in some embodiments) calculation module calculates FEC field 612 (e.g., FEC field 348 of FIGS. 3A, 3B). In the embodiment illustrated in FIG. 6, early CRC 608 is calculated based on the bits starting from (but excluding) the end of the last early CRC 604 (if present) until the end of the CRC field 608. The FEC 612 is calculated using all bits of a beacon frame including the CRC fields 604, 608. A network interface (such as the network interface 16) is configured to perform the processing illustrated in FIG. 6, in an embodiment. In an embodiment, FIG. 6 illustrates processing performed at an AP when generating a beacon frame. FIG. 6 is described in the context of the AP performing the processing for illustrative purposes, but in other embodiments a STA performs the processing illustrated in FIG. 6.

FIG. 6 illustrates a beacon frame 613 prior to calculation of CRCs 404, 408, and FEC 412, a beacon frame 614 after calculation and insertion of CRCs 404, 408, but prior to calculation of FEC 412, and a beacon frame 615 after calculation and insertion of the CRCs 404, 408 and FEC 412.

At a step 616, the AP resets a CRC calculation buffer 620. The CRC calculation buffer 620 is used to calculate and house calculated CRC values before they are inserted into the beacon frame for transmission. After resetting the CRC calculation buffer 620, the CRC calculation buffer 620 is used to store interim CRC calculation results based on processing data 624. After the data 624 is completely processed, the CRC calculation buffer 620 will hold a first calculated CRC result. The first calculated CRC stored in the buffer 620 is then inserted into CRC field 604 of the beacon frame 614 at step 628. Additionally, the CRC calculation buffer 620 is reset at step 632.

Then, the CRC calculation buffer 620 is used to store interim CRC calculation results based on processing data 636. After the data 636 is completely processed, the CRC calculation buffer 620 will hold a second calculated CRC result. The second calculated CRC stored in the buffer 620 is then inserted into CRC field 608 of the beacon frame 614 at step 640. Additionally, the CRC calculation buffer 620 is reset at step 644.

Then, an FEC calculation buffer 648 is used to store interim FEC calculation results based on processing the entire frame 614. After the frame 614 is completely processed, the FEC calculation buffer 648 will hold a calculated FEC result. The calculated FEC result stored in the buffer 648 is then inserted into FEC field 612 of the beacon frame 615.

FIG. 7 is a diagram illustrating receiver-side CRC processing 700 when a frame 702 includes multiple CRCs, such as the beacon frame 350, the beacon frame 380, or another suitable beacon frame, according to an embodiment. In an embodiment, a first error detection (or correction, in some embodiments) calculation module performs CRC processing corresponding to early CRCs 704, 708 (e.g., CRCs 362, 370 of FIGS. 3A, 3B), and a second error detection (or correction, in some embodiments) calculation module performs FEC processing corresponding to FEC field 712 (e.g., FEC field 348 of FIGS. 3A, 3B). In the embodiment illustrated in FIG. 7, first CRC processing corresponding to CRC field 704 is performed using bits at the beginning of a frame 702 through the CRC field 704. In an embodiment, second CRC processing corresponding to the CRC field 708 is performed using bits starting from (but excluding) the end of the last early CRC 704 (if present) through the CRC field 708. FEC processing corresponding to the FEC field 512 is performed using the entire frame 702. A network interface (such as the network interface 27) is configured to perform the processing illustrated in FIG. 7, in an embodiment. In an embodiment, FIG.

7 illustrates processing performed at a STA when processing a beacon frame. FIG. 7 is described in the context of a STA performing the processing for illustrative purposes, but in other embodiments an AP performs the processing illustrated in FIG. 7.

At a step 716, the STA resets a CRC calculation buffer 720. The CRC calculation buffer 720 is used to calculate and house CRC calculation values. After resetting the CRC calculation buffer 720, the CRC calculation buffer 720 is used to store interim and final CRC calculation results based on processing data 724. After the data 724 and the CRC field 704 are completely processed, the CRC calculation buffer 720 will hold a first calculated CRC result. The first calculated CRC stored in the buffer 720 is then compared to zero at step 728. When the first calculated CRC equals zero, this indicates no errors occurred in the data 724. Additionally, the CRC calculation buffer 720 is reset at step 732.

Then, the CRC calculation buffer 720 is used to store interim CRC calculation results based on processing data 736. After the data 736 and the CRC field 708 are completely processed, the CRC calculation buffer 720 will hold a second calculated CRC result. The second calculated CRC stored in the buffer 720 is then compared to zero at step 740. When the second calculated CRC equals zero, this indicates no errors occurred in the data 736. Additionally, the CRC calculation buffer 720 is reset at step 744.

Then, an FEC calculation buffer 748 is used to store interim FEC calculation results based on processing all data in the frame 702 including the CRC fields 704, 708. After the data in the frame 702 is completely processed, the FEC calculation buffer 720 will hold an FEC result. The FEC result stored in the buffer 720 is then compared to zero. When the FEC result equals zero, this indicates no errors occurred in the entire frame 702.

Referring again to FIGS. 3A and 3B, the AP (e.g., the network interface 16) is configured to place certain IEs prior to (e.g., in FIGS. 3A and 3B, to the left of) the CRC field 370 so that STAs can stop processing the beacon frame (e.g., and go into a power save mode) after processing the certain IEs when appropriate, in some embodiments. For example, the AP may tend to place one or more of (i) IEs that are changeable, (ii) IEs that are frequently changed, (iii) IEs that are most often changed, or (iv) IEs that are most interesting and/or important to STAs, prior to (e.g., in FIGS. 3A and 3B, to the left of) the CRC field 370 o help more STAs stop decoding earlier and save power, in some embodiments.

During a period of time after transmission of a beacon, an AP may have important transmissions to send to and/or receive from STAs. However, important transmissions may be corrupted and/or lost due to interference from STAs and/or an AP in an overlapping basic service set (OBSS), some embodiments and/or scenarios. To address this issue, the AP utilizes the duration field 316 (FIGS. 2, 3B) to reserve channel time after the beacon for special transmissions, in an embodiment. For example, the AP sets the duration field 316 to a time period that exceeds the length of the beacon. STAs use the duration field 316 to set respective network allocation vectors (NAVs), thus allowing the AP to reserve channel time after the end of the beacon, in an embodiment. This allows the special transmissions to occur without interference from OBSS stations, in an embodiment.

FIG. 8 is a timing diagram of an example beacon transmission sequence 800. The beacon transmission sequence 800 includes a first beacon 802 transmitted by an AP. A second beacon 814 is transmitted at a subsequent time after transmission of the first beacon 802. An interval between transmission of the first beacon 802 and the transmission of the second beacon 814 is a beacon interval 812. A transmit opportunity (TXOP) 810 is a channel time period reserved by the AP based on a duration field in the first beacon 402. FIG. 8 also shows 3 possible TXOPs based on different values of the duration field 316, including a duration D1 804, a duration D2 806, and a duration D3 808, according to various embodiments and/or scenarios. Duration D1 804 is equal to a maximum TXOP. Duration D2 806 is equal to 10% of the beacon interval 812. Duration D3 808 is equal to 20% of the beacon interval 812. In various embodiments and/or scenarios, the AP sets the duration field 316 to a suitable value such as D1, D2, D3, or some other suitable value.

In order to promote fair channel access, an AP should not use the duration field 316 of the beacon to set a very long period of time for special transmissions. Otherwise, OBSSs would be prevented from accessing the channel for too long of a time. In a first embodiment, the duration field is not permitted to be set to a value that exceeds a maximum transmit opportunity (TXOP) length 810. In FIG. 4, duration D1 804 is an example of a duration field value that is set to the maximum TXOP length 810. In other words, the duration field value can be set to a value that exceeds the length of the beacon frame but that is less than or equal to the maximum TXOP length.

In another embodiment, the duration field is permitted to be set to a value that is longer than the maximum transmit opportunity 810, but cannot exceed some suitable percentage of the beacon interval 812 and/or a medium time. For example, the duration field value may be limited to being no more than 10% of the beacon interval 812 or some other suitable percentage, in various embodiments. In FIG. 4, duration D2 806 is an example of a duration value is set to 10% of the beacon interval 812.

In another embodiment, the duration field can be longer than the maximum transmit opportunity 810, but cannot exceed the beacon interval 812 (or medium time) divided by a number of discovered APs in a neighborhood multiplied by a weight. In some embodiments, the weight is a positive value greater than zero. In some embodiments, the weight is a positive value greater than one. In some embodiments, the weight is a positive value less than one. In some embodiments, the weight is equal to one. In some embodiments, if there are no other discovered APs within the neighborhood, then the number of discovered APs in the neighborhood is set to one.

In the displayed embodiment of a beacon transmission sequence 800 in FIG. 8, the number of discovered APs in the neighborhood is five and the weight is one. As a result, the duration field cannot be longer than 20% of the beacon interval (or medium time), according to the displayed embodiment of FIG. 8. Duration D3 808 is 20% of the beacon interval 412.

In other embodiments, the value of the duration field is limited in other suitable ways to promote channel use fairness.

Figure 9:
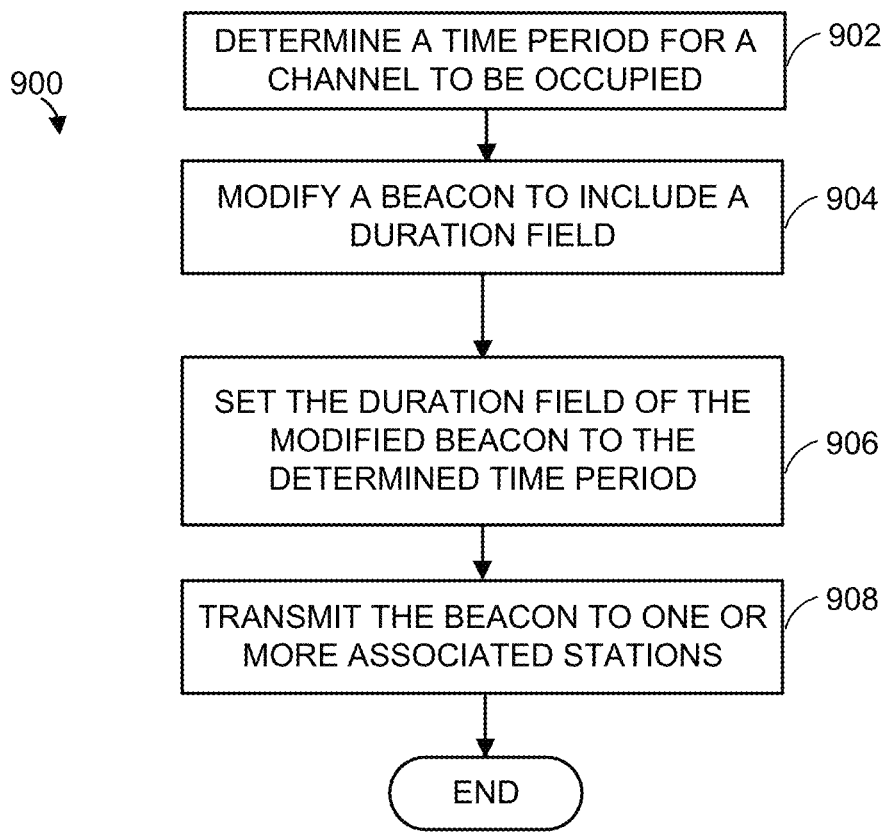
FIG. 9 is a flow diagram of an example method for reserving a time period that exceeds a length of a beacon frame, according to an embodiment.

FIG. 9 is a diagram of an example method 500 for an AP transmitting a beacon that includes a duration field. At block 502, the AP determines a time period for which a channel should be occupied for special transmissions. Next, at block 504, the AP modifies a beacon to include a duration field. At block 506, the AP sets the duration field of the modified beacon to the determined time period. In some embodiments, the determined time period for the duration field is based on one of the 3 aforementioned options from FIG. 4. In some embodiments, the determined time period is based on a different option than the three options discussed earlier. At block 508, the AP then transmits the beacon to one or more STAs. At block 510, the method is complete. In some embodiments, the method 500 includes more steps than those displayed in FIG.

5A. In some embodiments, the method 500 includes fewer steps than those displayed in FIG. 5A. In some embodiments, the method 500 includes steps arranged in a different order than the order shown in FIG. 5A.

Group broadcasting is another technique that allows STAs to conserve power. For a BSS with a large number of STAs, an AP can divide the STAs into multiple groups. The AP then sends a dedicated group beacon or traffic indication map (TIM) announcement frame for each group. In one embodiment, the AP sends the dedicated group beacon or TIM announcement frame only to the STAs within the dedicated group. Other STAs within the BSS that are not part of the addressed group do not process the dedicated group beacon or TIM announcement frame from the AP. In one embodiment, the AP can send multiple dedicated group beacons at one time. The AP could also segment a long TIM based on the groups. The TIM segments are conveyed by each group's beacon or TIM frame. Because of group broadcasting, the STAs only need to wake up for the beacon or TIM frame corresponding to the group to which the STAs belong. As a result, the STAs may save power.

Figure 10:
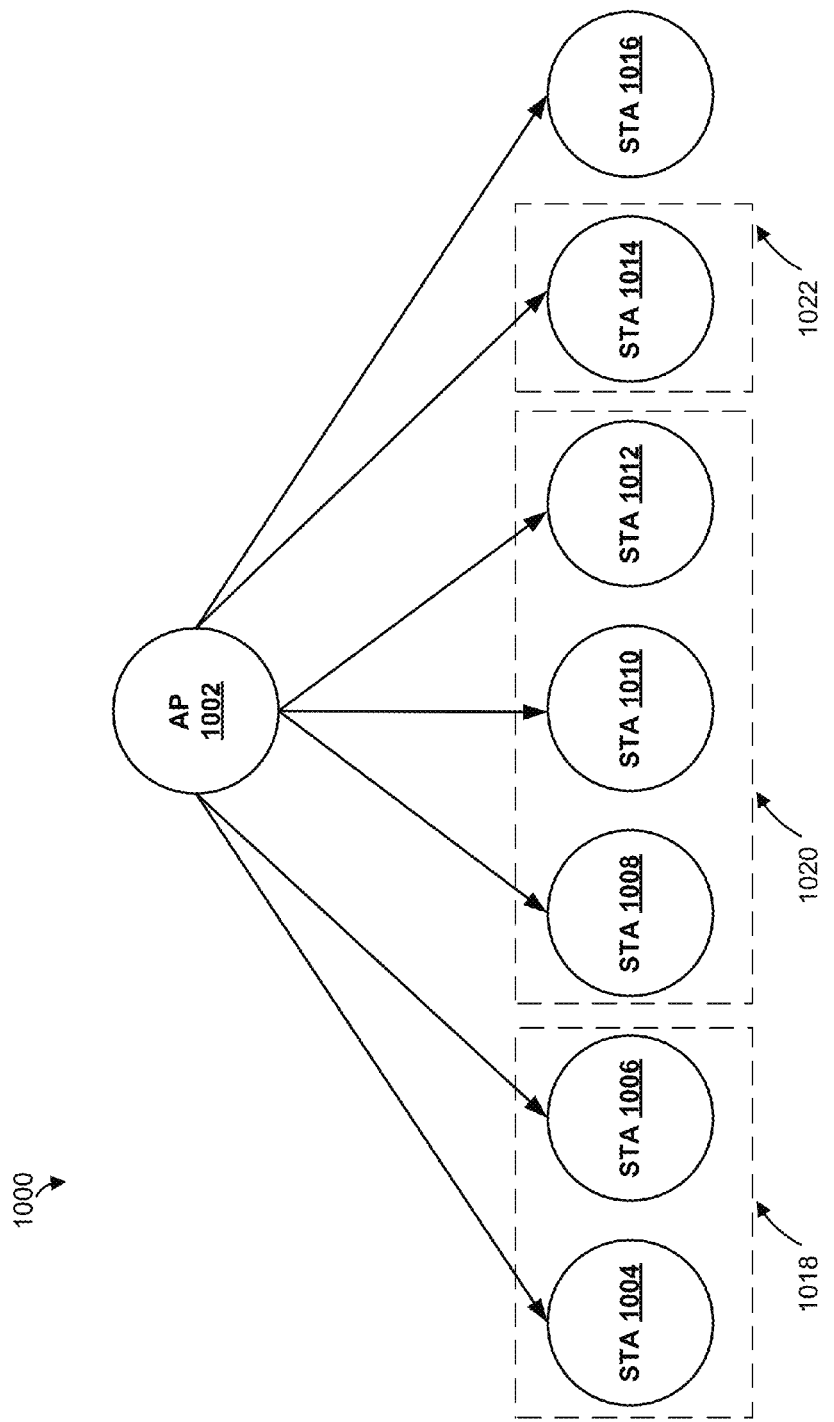
FIG. 10 is a diagram of an example network comprising an AP communicating with one or more grouped STAs, according to an embodiment.

FIG. 10 is a diagram of an example network 1000 including an AP 1002 communicating with multiple groups of STAs. The AP 1002 communicates with STA Group 1 1018, STA Group 2 1020, and STA Group 3. The AP 1002 also communicates with STA 1016, which is not in a group. The AP 1002 sends a dedicated group beacon or TIM frame to a particular one of the Groups 1, 2, and 3. The dedicated group beacon or TIM frame includes information specific to the addressed group. In some embodiments, the dedicated group beacon or TIM frame also includes information common for all of the groups. In some embodiments, the dedicated group beacon or TIM frame includes timing information indicating when respective next dedicated group beacons or TIM frames will be transmitted to each group. The AP 1002 can divide the STAs into groups based on bandwidth, distance, direction, location, or some other suitable criteria. Occasionally, a full Beacon can be transmitted by the AP to all of the STAs with the information for all of the groups.

Figure 11:
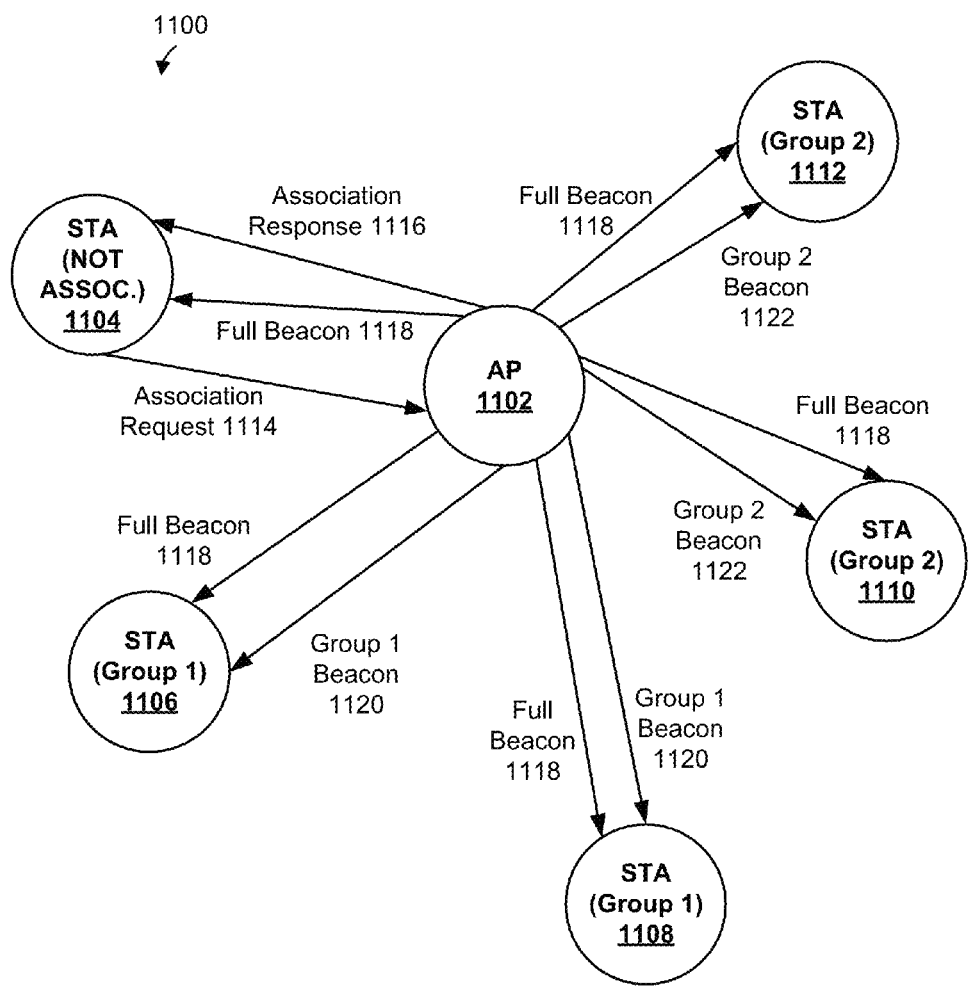
FIG. 11 is a diagram of an example network comprising an AP sending group based beacons to one or more STAs, according to an embodiment.

FIG. 11 is a diagram of an example network 1100 comprising an AP 1102, and STAs 1104, 1106, 1108, 1110, and 1112. STAs 1106 and 1108 are in Group 1 while STAs 1110 and 1112 are in Group 2. STA 1104 is not associated with any group. The diagram shows various messages exchanged between the AP 1102 and the various STAs. In the illustrated scenario, the AP 1102 sends a dedicated Group 1 beacon 1120 addressed to Group 1 (which includes STAs 1106 and 1108). The AP 1102 also sends a dedicated Group 2 beacon 1122 addressed to Group 2 (which includes STAs 1110 and 1112). All of the STAs (1104, 1106, 1108, 1110, and 1112) receive and process the full beacon 1118 from the AP 1102. In other embodiments, similarly addressed TIM frames are transmitted instead of the illustrated beacons.

As will be discussed subsequently, a probe response may have a format similar to the beacon formats discussed above, in some embodiments. Thus in some embodiments, the probe responses similar to the beacons 1118, 1120, and 1122 are transmitted. A full probe response may be transmitted similar to the full beacon 1118. In this case, the full probe response would be sent to all of the STAs (1104, 1106, 1108, 1110, and 1112), in an embodiment. Alternatively, the probe response is a dedicated group probe response, similar to the group 1 beacon 1120 and the group 2 beacon 1122. A dedicated group probe response is addressed to a particular group. For example, a dedicated probe response for group 1 is addressed to Group 1, which includes STAs 1106 and 1108.

In some embodiments, the unassociated STA 1104 may scan multiple beacons from AP 1102 to determine a preferred group to join. Unassociated STA 1104 then indicates its group preference by sending an association request 1114 to the AP 1102. After receiving the association request 1114, the AP 1102 sends an association response 1116 to the requesting unassociated STA 1104. The response 1116 indicates to unassociated STA 1104 to which groups STA 110 now belongs. The AP 1102 decides the group to which STA 1104 belongs. In some embodiments, the AP 1102 allows STA 1104 to become a part of groups based on the preferences indicated in its association request 1114.

Figure 12:
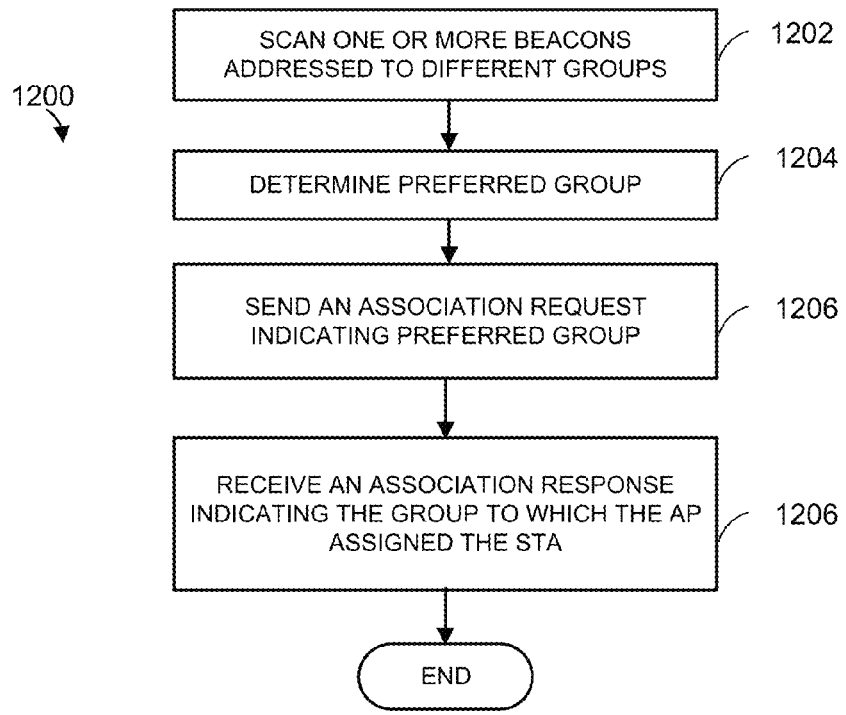
FIG. 12 is a flow diagram of an example method for informing an AP of a group preference, according to an embodiment.

FIG. 12 is a flow diagram of an example method 1200 for a STA to send an association request to an AP. The network interface 27 (FIG. 1) is configured to implement the method 1200, in an embodiment. In other embodiments, the method 1200 is implemented by another suitable device.

At block 1102, the STA processes one or more beacons from an AP, the beacons addressed to multiple different groups of stations. At block 1104, the STA determines a group preferred by the STA.

At block 1106, the STA sends an association request to the AP, the request indicating the preferred group selected at block 1104.

At block 1108, the STA receives an association response from the AP, the association response being responsive to the association request transmitted by the STA at block 1106. The association response indicates a group to which the AP assigned the STA. In some scenarios, the group to which the AP assigned the STA is the same as the preferred group selected at block 1104. In other scenarios, however, the group to which the AP assigned the STA is different than the preferred group selected at block 1104.

In some embodiments, the STA also transmits one or more probe request frames to solicit one or more group-based probe responses from the AP, and the STA determines a preferred group further based on reception of the one or more group-based probe responses from the AP.

Figure 13:
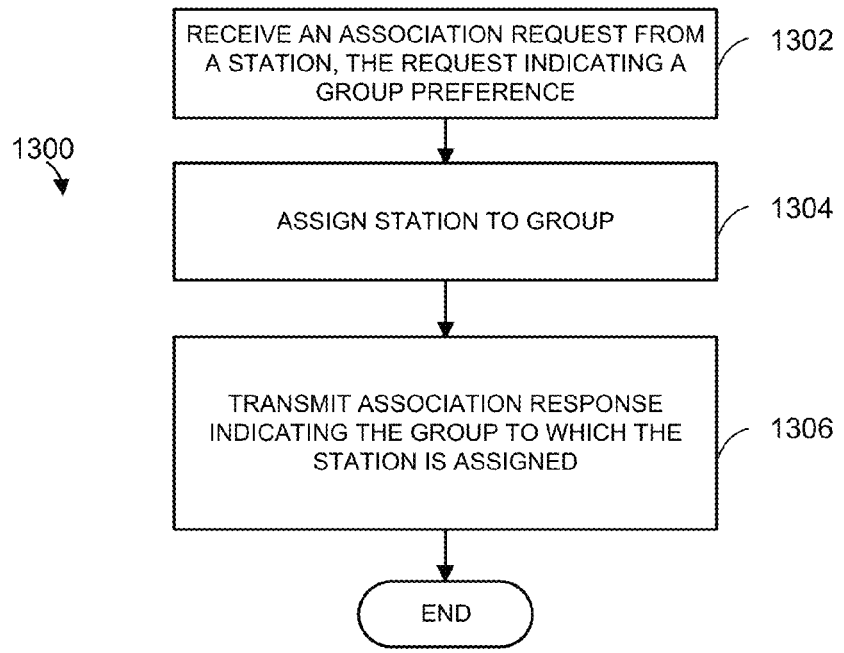
FIG. 13 is a flow diagram of an example method for processing an association request that includes a group preference, according to an embodiment.

FIG. 13 is a flow diagram of an example method 1300 for an AP to assign a STA to a group. At block 1302, the AP receives and processes an association request from an STA, the association request indicating a group to which the STA would prefer to be assigned.

At block 1304, the AP assigns the STA to a group. In an embodiment, the AP considers the group preference received at block 1302 when determining to which group to assign the STA. In some scenarios, the AP assigns the STA to the group indicated by the STA as preferred in the request received at block 1302. In other scenarios, however, the AP assigns the STA to a group other than the group indicated by the STA as preferred in the request received at block 1302.

At block 1306, the AP generates and transmits an association response to the STA. The response includes an indication of the group to which the AP assigned the STA.

Figure 14:
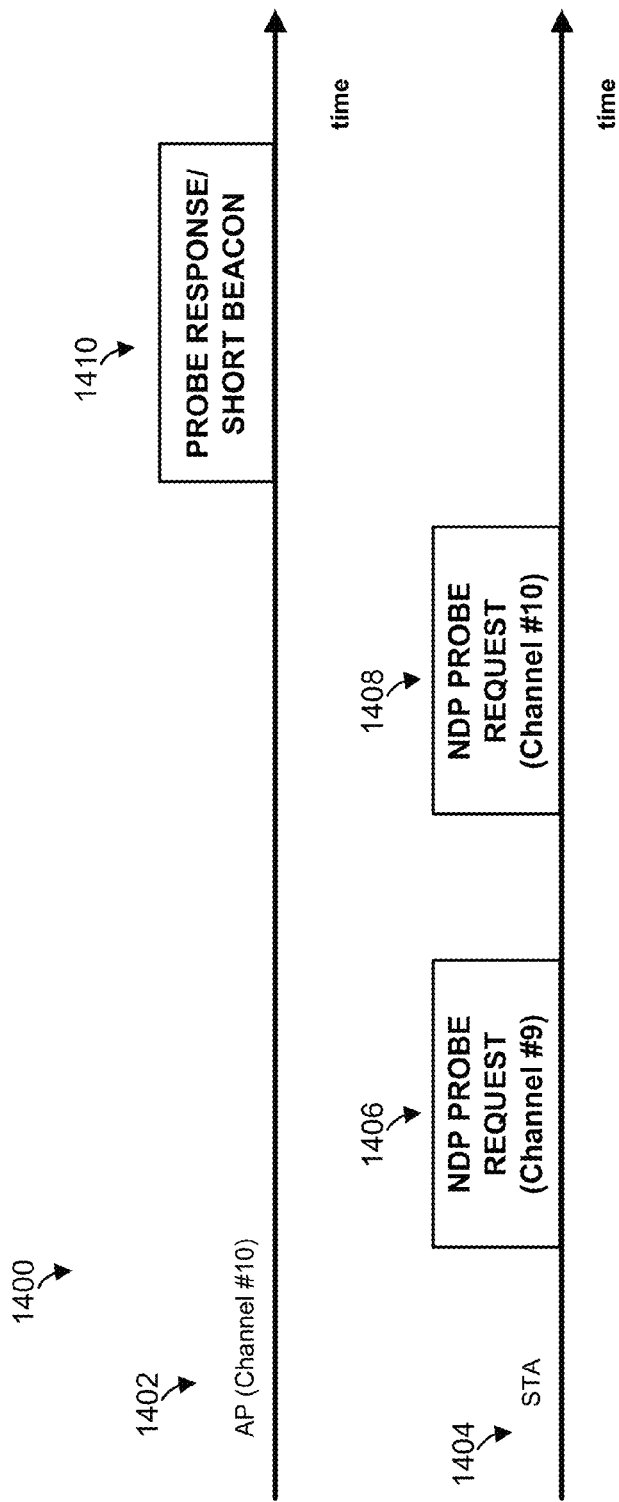
FIG. 14 is a diagram illustrating an example of an AP probe response transmission sequence, according to an embodiment.

An STA may actively scan a network to find an AP to communicate with. During active scanning, the STA may send a null data packet (NDP) short probe request. Upon receipt, an AP may broadcast a probe response or a short beacon. FIG. 14 is a diagram of an example of a probe response transmission sequence 1400, according to an embodiment. In the displayed scenario, a STA 1404 first sends an NDP probe request 1406 on Channel #9. Because the AP is not operating on Channel #9, no response to the probe request 1406 is received by the STA 1404.

STA 1404 then sends an NDP Probe Request 1408 on Channel #10. The request 1408 is received by AP 1402 on Channel #10. In response, the AP 1402 on Channel #10 broadcasts a probe response or a short beacon 1410. The response or beacon 1410 contains network information that enables STA 1404 to communicate with AP 1402.

Although the displayed scenario in FIG. 14 may allow STA 1404 to communicate with AP 602, several drawbacks exist with the probe response transmission sequence 1400. For example, if Channel #10 is busy, the probe response or short beacon 1410 may collide with transmissions from other APs on the same channel. Because of these collisions, STA 1404 may not receive the probe response or short beacon 1410 from AP 1402.

As another example, because the probe response/short beacon 1410 is broadcast by AP 1402, the probe response/short beacon 1410 will not be resent by AP 1402. As a result, if STA 1404 does not receive the response/short beacon 1410 from AP 1402 during the first broadcast due to a collision, STA 1404 may be delayed in receiving a probe response/short beacon 1410. STA 1404 may thus send another probe request 1408 to receive a probe response/short beacon 610 from AP 602. Or, STA 1404 may move on to a different channel (such as Channel #11) to send probe requests, causing STA 1404 to miss an opportunity to communicate with AP 1402 on Channel #10. Each of these results is inefficient and undesirable.

Further, because AP 1402 broadcasts its probe response/short beacon 1410 and without expecting an acknowledgment (ACK), the AP 1402 never adjusts its probe response to have a longer backoff time for future probe responses or short beacons. Thus, if an AP 1402 broadcasts a probe response/short beacon 1410 that collides with other transmissions from other APs or STAs on the same channel (Channel #10), AP 1402 never makes adjustments for future transmissions to avoid these collisions. As a result, the same collisions and potential inefficient STA and AP communications, as described earlier, may be repeated for future transmissions from the AP because the AP does not modify its future transmissions (e.g. using a longer backoff time for probe responses/beacons).

Figure 15:
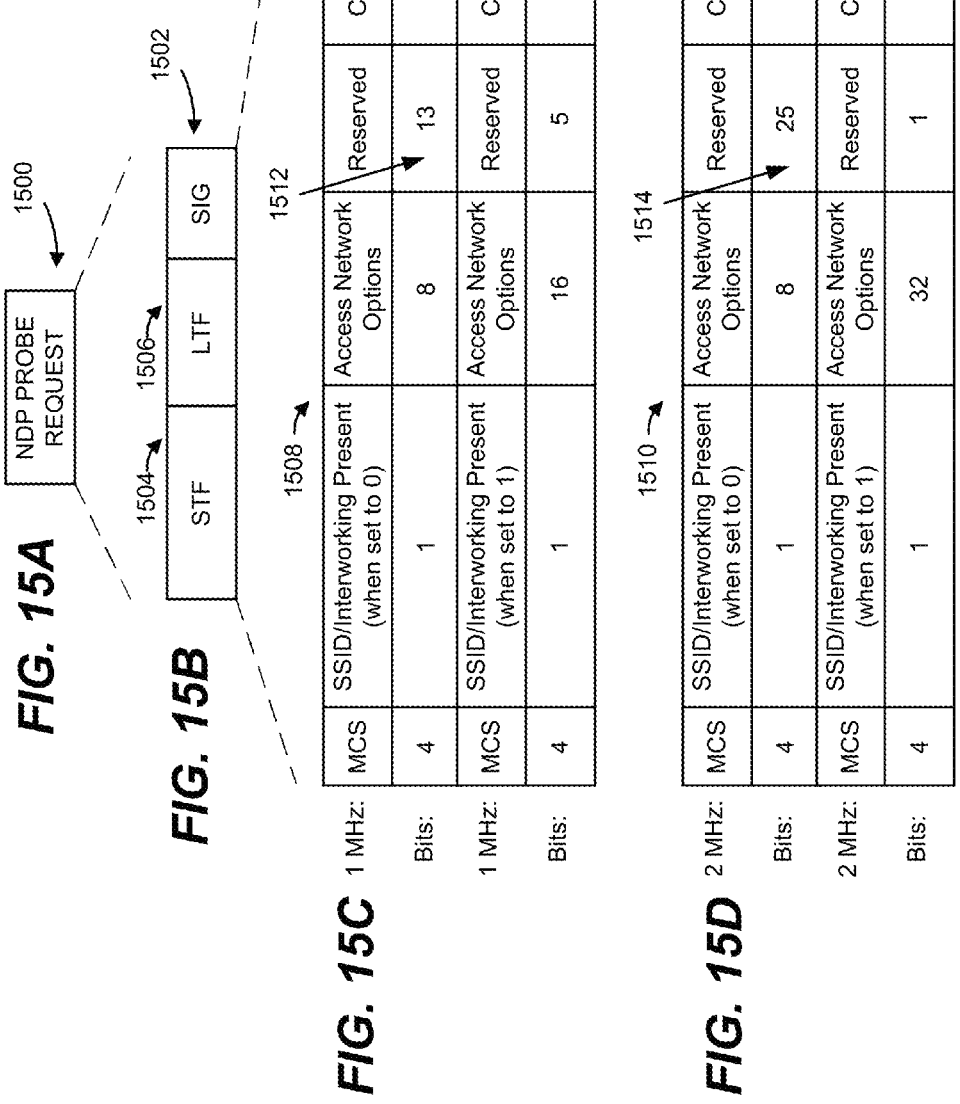
FIG. 15A is a diagram of an example probe request, according to one embodiment.
FIG. 15B is a diagram of an example probe request format, according to an embodiment.
FIG. 15C is a diagram of an example short probe request SIG field, according to an embodiment.
FIG. 15D is a diagram of an example short probe request SIG field, according to another embodiment.

To address these potential communication issues with the probe response transmission sequence 1400 in FIG. 14, a different probe response transmission sequence can be used that takes advantage of a probe request format similar to the beacon formats discussed above. FIG. 15A is a diagram of an example of a null data packet (NDP) Probe Request 1500. The NDP Probe Request 1500 includes several fields, as shown in FIG. 15B. These fields include a short training field (STF) field 1504, a long training field (LTF) field 1506, and a signal (SIG) field 1502. FIG. 15C is a table of the various fields 1508 included in the SIG field for 1 MHz PHY transmissions, according to one embodiment. FIG. 15D is a table of the various fields 1510 included in the SIG field for 2 MHz PHY transmissions, according to another embodiment. In FIGS. 15C and 15D, reserved fields 1512 and 1514 can be used to store information about the STA sending the probe request. In one embodiment, one or both of fields 1512 and 1514 include a probe identifier. In another embodiment, one or both of fields 1512 and 1514 includes a random token associated with the requesting STA. In some embodiments, one or both of fields 1512 and 1514 includes a unique identifier of the STA sending the probe request.

Figure 16:
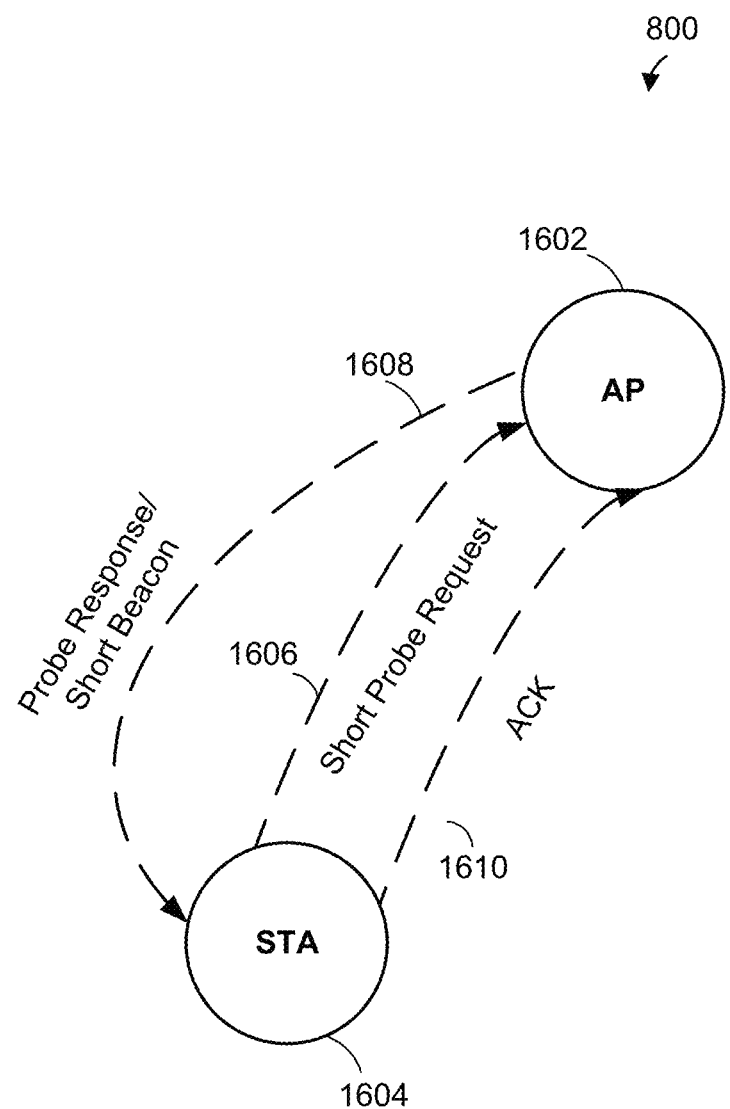
FIG. 16 is a diagram of an example network in which an AP sends a probe response to an STA after receiving a short probe request from the STA, according to an embodiment.

FIG. 16 is a diagram of an example probe response transmission sequence 1600 that can address the collisions and potential communication issues discussed earlier, according to an embodiment. In the displayed embodiment of FIG. 16, a STA 1604 sends a short probe request 1606 to an AP 1602. In one embodiment, the short probe request 1606 is an NDP short probe request. Upon receiving the request 1606, AP 1602 responds by transmitting a unicast probe response/short beacon 1608 to STA 1604. The probe response/short beacon 1608 includes a unique identifier of the requesting STA 1604 that was part of the short probe request 1606. Once STA 1604 receives the probe response/short beacon 1608 from AP 1602, STA 1604 immediately responds with an ACK message 1610 to AP 1602. If AP 1602 does not receive an immediate ACK 1610 from STA 1604 after AP 1602 sends the probe response/short beacon 1608, then AP 1602 sends another probe response/short beacon 1608 to STA 1604. Furthermore, if AP 1602 does not receive the immediate ACK 1610 from STA 1604, AP 1602 retries transmitting a probe response/short beacon 1608 to STA 1604 after a longer backoff time to help avoid any potential collisions.

Figure 17:
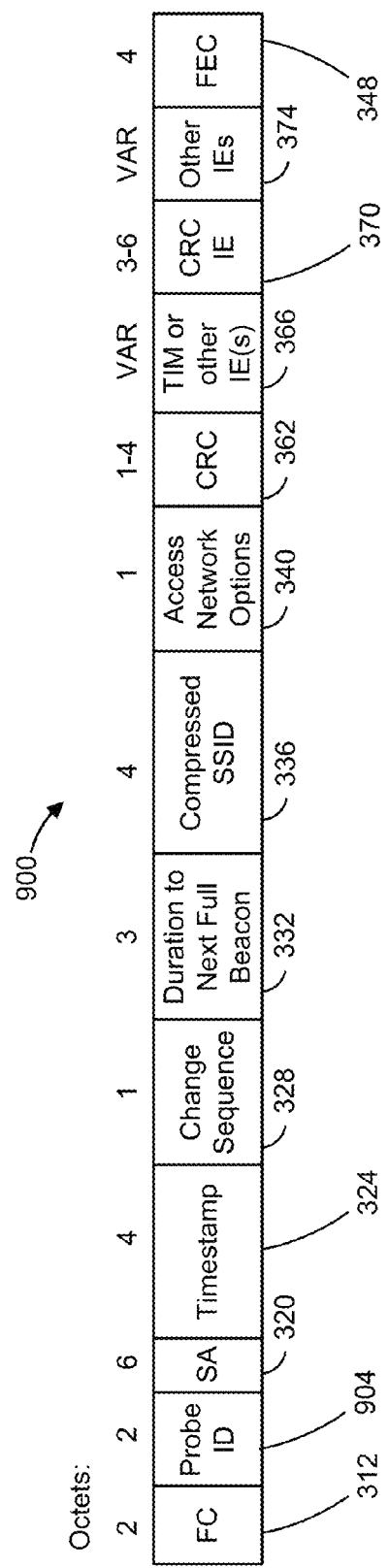
FIG. 17 is a diagram of an example short probe response format, according to an embodiment.

FIG. 17 is a diagram showing an example of the probe response format 1700. The probe response format 1700 is similar to the example beacon format 350 of FIG. 3A, and like-numbered elements will not be discussed in detail for purposes of brevity.

The probe response 1700 includes a Probe ID field 1704. In an embodiment, the Probe ID field 1704 includes the unique identifier 1512, 1514 (FIGS. 15C, 15D) of the STA to which the probe response is directed. In some embodiments, the identifier 1512, 1514 (FIGS. 15C, 15D) and the Probe ID field 1704 includes an association ID (AID). In some embodiments, the identifier 1512, 1514 (FIGS. 15C, 15D) and the Probe ID field 1704 includes a scrambled code that is formatted for checking by the forwarded checking sequence. In some embodiments, the identifier 1512, 1514 (FIGS. 15C, 15D) and the Probe ID field 1704 include a unique identifier, such as a token, a key, or some other unique ID.

A probe response frame such as the example frame 1700 is sent in response to a probe request. Alternatively, the probe response frame 1700 is sent in response to a Power Save (PS) Poll frame in an actively polling case, which is discussed in more detail in U.S. patent application Ser. No. 13/450,209 filed on Apr. 18, 2012 and entitled "Reducing Power Consumption in a Wireless Communication System," which is hereby incorporated by reference herein in its entirety. If a probe response is sent in response to a unicast requesting frame, the probe response can be sent a short interframe space (SIFS) after the requesting frame, or the response can be a delayed response. For example, an immediate ACK can be sent to the requesting frame first, followed by the probe response after channel access has been granted. But if the requesting frame is a broadcast frame (such as a probe request), the probe response can be a delayed response to avoid several APs sending responses at the same time.

As illustrated in FIG. 17, the probe response frame is designed to have a very similar format as a beacon frame, in some embodiments. By doing so, a transmitter can keep a single copy in the transmit queue for both the beacon and probe response frames. Because of the similarity of the probe response and beacon formats, the probe response frame can serve as an on-demand and additional beacon from an AP. If the intended receiver (as indicated in the Probe ID field, 1706) of the probe response frame upon receipt of the frame should send an immediate ACK to confirm the correct receiving of the frame to the AP. An unintended receiver, on the other hand, can also process received probe responses from any AP as additional beacons for quick AP discovery and/or synchronization, but without sending an ACK.

After receiving the probe response from an AP, the requesting STA should send an immediate ACK to the AP, in an embodiment. In some embodiments, the immediate ACK can be a short ACK, which is discussed in more detail in U.S. patent application Ser. No. 13/586,678 filed on Aug. 15, 2012 and entitled "Long Range WLAN Data Unit Format," which is hereby incorporated by reference herein in its entirety. In some embodiments, the ACK can be a long ACK with a short MAC header, which is also discussed in U.S. patent application Ser. No. 13/586,678, filed on Aug. 15, 2012 and entitled "Long Range WLAN Data Unit Format," which is hereby incorporated by reference herein in its entirety. In some embodiments, the acknowledgment ID (AID) of the STA is replaced by the Probe ID field in the ACK. In some embodiments, the ACK has a different format the aforementioned formats.

Also, the probe response frame can indicate it is a beacon or probe response frame in a variety of ways. In one embodiment, one bit in the SIG and/or Service field is used to indicate a beacon or probe response frame. This allows an STA that is only interested in beacon or probe response frames to quickly filter out other undesired frames that don't have this indication.

Figure 18:
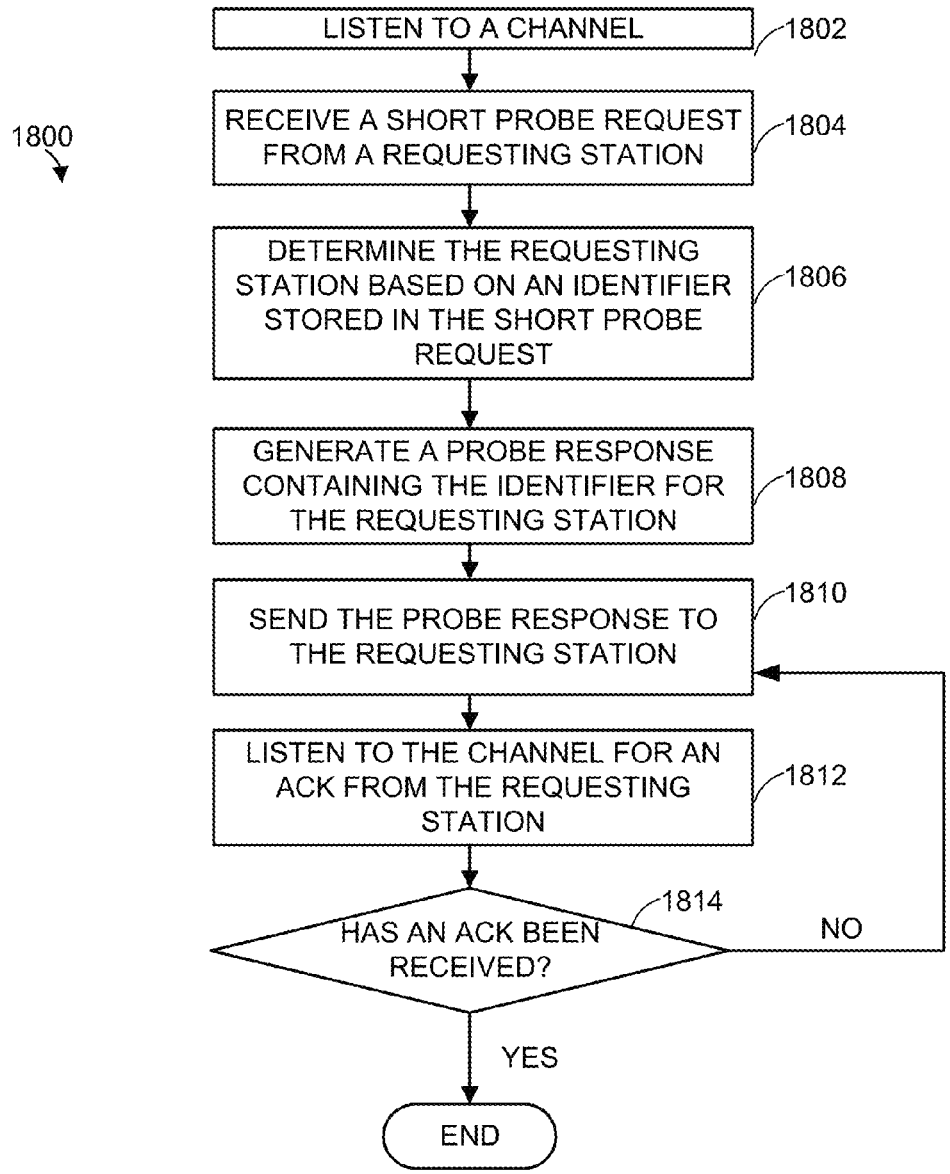
FIG. 18 is a flow diagram of an example method for transmitting a short probe response to an STA after receiving a probe request from the STA, according to an embodiment.

FIG. 18 is a diagram of an example method 1800 for an AP generating and transmitting a probe response. At block 1802, the AP listens to a channel for transmissions. Next, at block 1804, the AP receives a short probe request from a requesting STA. After receiving the request, at block 1806, the AP determines the requesting STA based on the identifier stored in the short probe request. After that, at block 1808, the AP generates a probe response containing the identifier for the requesting STA. Once generated, at block 1810, the AP sends the probe response to the requesting STA. Once sent, at block 1812, the AP listens to the channel for an immediate ACK from the requesting STA. The AP then checks to see if an ACK has been received at 1814. If the ACK isn't received, the AP sends the probe response to the requesting STA again, at block 1810, listens for an immediate ACK at block 1812, and checks again at 1814 to see if the ACK has been received.

Figure 19:
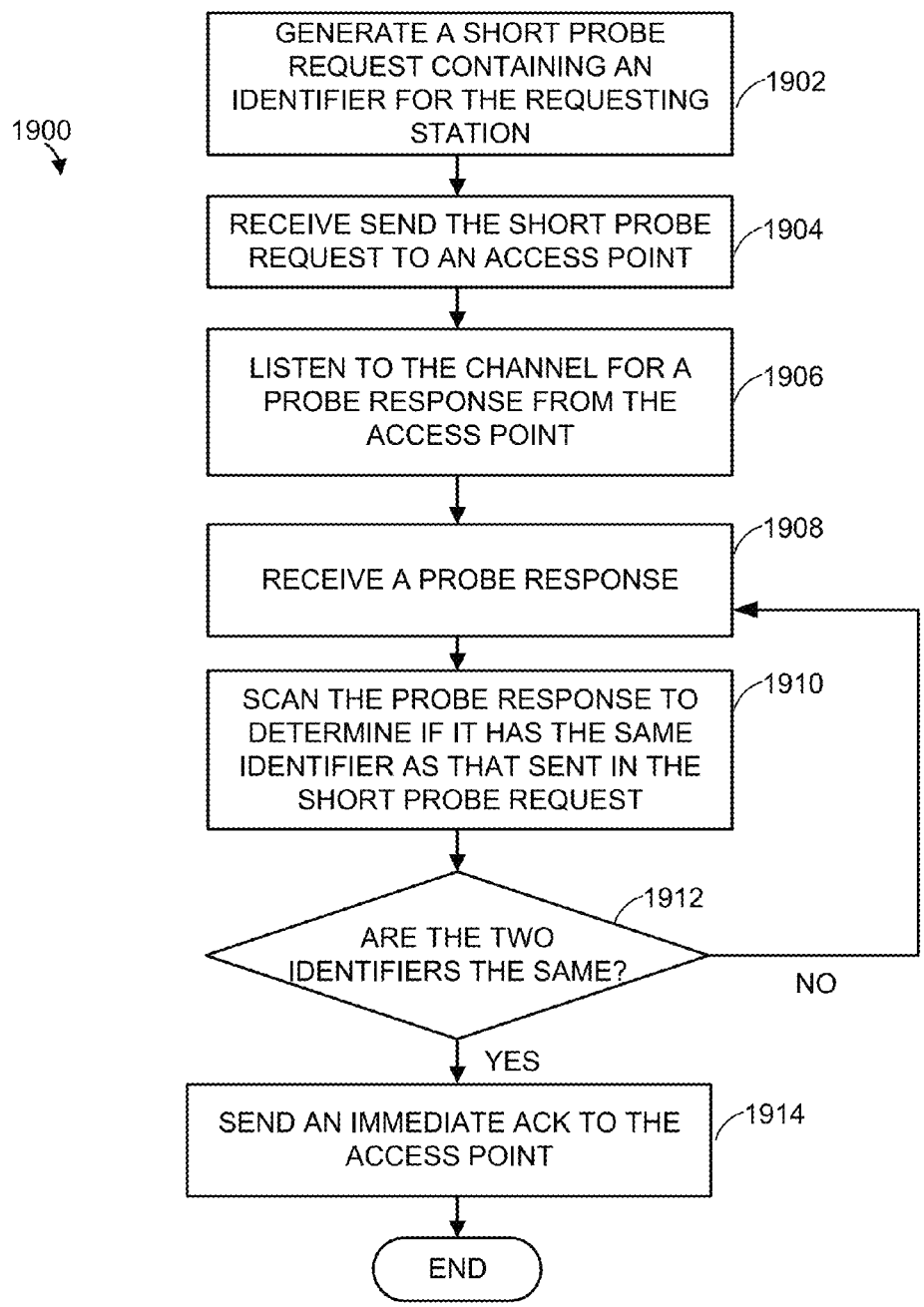
FIG. 19 is a flow diagram of an example method for transmitting a short probe request and acknowledging a probe response from an AP, according to an embodiment.

FIG. 19 is a diagram of an example method 1900 of an STA generating and transmitting a short probe request. At block 1902, the STA generates a short probe request containing an identifier for the requesting STA. At block 1904, the STA sends the short probe request to the AP. At block 1906, the STA listens to the channel for a probe response from the AP. At 1908, the STA receives a probe response from the AP. Next, at 1910, the STA scans the probe response to determine if the stored identifier is the same as that sent in the short probe request by the STA. At 1912, the STA determines if the two identifiers are the same. If they are not, then the STA repeats block 1908 by waiting and receiving a response from the AP. Blocks 1910 and 1912 are also repeated until the STA receives a probe response with the same identifier as the probe request. Once the STA does receive the probe response with the same identifier, the STA sends an immediate ACK to the AP at block 1914.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Additionally, further aspects of the present invention relate to any combination of one or more of the following clauses.

In an embodiment, a method for transmitting network information for a wireless network includes determining whether (i) a short beacon is to be transmitted, or (ii) a full beacon is to be transmitted; generating, at a network interface device, a beacon frame corresponding to a unified beacon format, including generating a first portion of the beacon frame, wherein the first portion has the same format whether (i) it is determined to transmit the short beacon frame or, (ii) it is determined to transmit the full beacon frame; generating a second portion of the beacon frame, wherein the second portion corresponds to a first subformat when it is determined to transmit the short beacon frame, the second portion corresponds to a first subformat when it is determined to transmit the full beacon frame, and the first subformat is different than the second subformat, and including, (i) in the beacon frame or (ii) in a physical layer (PHY) header associated with the beacon frame, an indication of whether the beacon frame corresponds to the first subformat or the second subformat; and transmitting, using the network interface device, the beacon frame.

In other embodiments, the method includes any combination of one or more of the following elements.

The first portion includes (i) a frame control field, and (ii) a source address field.

The first portion includes only one address field.

The first portion includes a duration field.

The first portion includes a timestamp field.

When the second portion corresponds to the first subformat, the second portion (i) includes a compressed service set identifier (SSID), and (ii) excludes an SSID, and when the second portion corresponds to the second subformat, the second portion (i) includes the SSID, and (ii) excludes the compressed SSID.

In another embodiment, an apparatus comprises a network interface device configured to determine whether (i) a short beacon is to be transmitted, or (ii) a full beacon is to be transmitted, generate a beacon frame corresponding to a unified beacon format, including generating a first portion of the beacon frame, wherein the first portion has the same format whether (i) it is determined to transmit the short beacon frame or, (ii) it is determined to transmit the full beacon frame, generating a second portion of the beacon frame, wherein the second portion corresponds to a first subformat when it is determined to transmit the short beacon frame, the second portion corresponds to a first subformat when it is determined to transmit the full beacon frame, and the first subformat is different than the second subformat, and include, (i) in the beacon frame or (ii) in a physical layer (PHY) header associated with the beacon frame, an indication of whether the beacon frame corresponds to the first subformat or the second subformat, and transmit the beacon frame or cause the beacon frame to be transmitted.

In other embodiments, the apparatus includes any combination of one or more of the following elements.

The first portion includes (i) a frame control field, and (ii) a source address field.

The first portion includes only one address field.

The first portion includes a duration field.

The first portion includes a timestamp field.

When the second portion corresponds to the first subformat, the second portion (i) includes a compressed service set identifier (SSID), and (ii) excludes an SSID, and when the second portion corresponds to the second subformat, the second portion (i) includes the SSID, and (ii) excludes the compressed SSID.

In another embodiment, a method for receiving network information for a wireless network includes receiving, at a communication device, a beacon frame transmitted by an access point, wherein a physical layer (PHY) header is associated with the beacon frame, wherein the beacon frame has a unified format; determining, based on an indicator (i) in the beacon frame or (ii) in the PHY header, whether the beacon frame has a short beacon subformat or a full beacon subformat; processing a first portion of the beacon frame, wherein the first portion has the same format whether the beacon frame has (i) the short beacon subformat or, (ii) the full beacon subformat; when it is determined that the beacon frame has the short beacon subformat, processing a second portion of the beacon frame according to the short beacon subformat; when it is determined that the beacon frame as the full beacon subformat, processing the second portion of the beacon frame according to the full beacon subformat; and determining network information communicated by the access point based on (i) the processing of the first portion, and (ii) the processing of the second portion.

In other embodiments, the method includes any combination of one or more of the following elements.

The first portion includes (i) a frame control field, and (ii) a source address field.

The first portion includes only one address field.

The first portion includes a duration field.

The first portion includes a timestamp field.

When the beacon frame has the short beacon subformat, the second portion (i) includes a compressed service set identifier (SSID), and (ii) excludes an SSID, and when the beacon frame has the full beacon subformat, the second portion (i) includes the SSID, and (ii) excludes the compressed SSID.

In another embodiment, an apparatus comprises a network interface device configured to receive a beacon frame that was transmitted by an access point, wherein a physical layer (PHY) header is associated with the beacon frame, and wherein the beacon frame has a unified format, determine, based on an indicator (i) in the beacon frame or (ii) in the PHY header, whether the beacon frame has a short beacon subformat or a full beacon subformat, process a first portion of the beacon frame, wherein the first portion has the same format whether the beacon frame has (i) the short beacon subformat or, (ii) the full beacon subformat, when it is determined that the beacon frame has the short beacon subformat, process a second portion of the beacon frame according to the short beacon subformat, when it is determined that the beacon frame as the full beacon subformat, process the second portion of the beacon frame according to the full beacon subformat, and determine network information communicated by the access point based on (i) the processing of the first portion, and (ii) the processing of the second portion.

In other embodiments, the apparatus includes any combination of one or more of the following elements.

The first portion includes (i) a frame control field, and (ii) a source address field.

The first portion includes only one address field.

The first portion includes a duration field.

The first portion includes a timestamp field.

When the beacon frame has the short beacon subformat, the second portion (i) includes a compressed service set identifier (SSID), and (ii) excludes an SSID, and when the beacon frame has the full beacon subformat, the second portion (i) includes the SSID, and (ii) excludes the compressed SSID.

In another embodiment, a method for transmitting network information for a wireless network includes allocating, at an access point, a plurality of stations among multiple groups, the multiple groups including a first group and a second group; generating, at a network interface of the access point, a first beacon frame including network information for the first group; generating, at the network interface of the access point, a second beacon frame including network information for the second group; transmitting, using the network interface device, the first beacon frame; and transmitting, using the network interface device, the second beacon frame.

In other embodiments, the method includes any combination of one or more of the following elements.

Transmitting the first beacon frame includes transmitting, with or in the first beacon frame, an identifier of the first group; and transmitting the second beacon frame includes transmitting, with or in the second beacon frame, an identifier of the second group.

Generating the first beacon frame includes inserting the identifier of the first group in the first beacon frame; and generating the second beacon frame includes inserting the identifier of the second group in the second beacon frame.

The method further includes inserting the identifier of the first group in a physical layer (PHY) header associated with the first beacon frame; and inserting the identifier of the second group in a PHY header associated with the second beacon frame.

The identifier of the first group includes a first association identifier (AID); and the identifier of the second group includes a second AID.

The method further includes receiving, at the access point, an association request from an unassociated station, the association request including an indicator of a preference for group assignment; and assigning, at the access point, the unassociated station to one of the groups in the multiple groups based on the preference for group assignment.

In another embodiment, an apparatus comprises a network interface device configured to allocate a plurality of stations among multiple groups, the multiple groups including a first group and a second group, generate a first beacon frame including network information for the first group, generate a second beacon frame including network information for the second group, cause the first beacon frame to be transmitted, and cause the second beacon frame to be transmitted.

In other embodiments, the apparatus includes any combination of one or more of the following elements.

The network interface device is configured to cause the first beacon frame to be transmitted with an identifier of the first group, and cause the second beacon frame to be transmitted with an identifier of the second group.

The network interface device is configured to insert the identifier of the first group in the first beacon frame, and insert the identifier of the second group in the second beacon frame.

The network interface device is configured to insert the identifier of the first group in a physical layer (PHY) header associated with the first beacon frame, and insert the identifier of the second group in a PHY header associated with the second beacon frame.

The identifier of the first group includes a first association identifier (AID); and the identifier of the second group includes a second AID.

The network interface device is configured to receive an association request from an unassociated station, the association request including an indicator of a preference for group assignment, and assign an unassociated station to one of the groups in the multiple groups based on the preference for group assignment.

In another embodiment, a method for receiving network information for a wireless network includes receiving, at a communication device, a plurality of beacon frames, each beacon frame addressed to a respective group of stations, wherein the plurality of beacon frames have been transmitted by an access point; determining, at the communication device, a preferred group, wherein determining the preferred group is based on reception of the plurality of beacon frames; generating, at the communication device, an association request that includes an indication of the preferred group; transmitting, with the communication device, the association request to the access point; and receiving, at the communication device, a response to the association request, the response indicating an assignment, by the access point, of the communication device to one of the groups.

In other embodiments, the method includes any combination of one or more of the following elements.

The method further comprises transmitting, with a communication device, one or more probe request frames, each probe request frame corresponding to a respective group of stations; and receiving, at the communication device, one or more group-based probe response frames responsive to the one or more probe request frames, wherein each of the one or more group-based probe response frames includes an indicator of a group to which the group-based probe response frame corresponds; wherein determining the preferred group is further based on reception of the one or more group-based probe response frames.

For each beacon frame: a respective group identifier is (i) in a physical layer (PHY) header associated with the beacon frame, or (ii) in the beacon frame.

Each group identifier comprises an association identifier (AID).

In another embodiment, an apparatus comprises a network interface configured to:

receive a plurality of beacon frames, each beacon frame addressed to a respective group of stations, wherein the plurality of beacon frames have been transmitted by an access point, determine a preferred group, wherein determining the preferred group is based on reception of the plurality of beacon frames, generate an association request that includes an indication of the preferred group, transmit the association request to the access point, and receive a response to the association request, the response indicating an assignment, by the access point, of the communication device to one of the groups.

In other embodiments, the apparatus includes any combination of one or more of the following elements.

The network interface is configured to: transmit one or more probe request frames, each probe request frame corresponding to a respective group of stations, and receive one or more group-based probe response frames responsive to the one or more probe request frames, wherein each of the one or more group-based probe response frames includes an indicator of a group to which the group-based probe response frame corresponds, determine the preferred group further based on reception of the one or more group-based probe response frames.

For each beacon frame: a respective group identifier is (i) in a physical layer (PHY) header associated with the beacon frame, or (ii) in the beacon frame.

Each group identifier comprises an association identifier (AID).

In another embodiment, a method for transmitting network information for a wireless network includes determining a length of a time period corresponding to reserving a communication channel, the length of the time period exceeding the length of a beacon frame; generating a beacon frame, the beacon frame having a duration field; setting the duration field to a value corresponding to the length of the time period in order to reserve the communication channel for the time period, the length of the time period exceeding the length of the beacon frame; and transmitting the beacon frame.

In other embodiments, the method includes any combination of one or more of the following elements.

The determined length of the time period must be less than or equal to a maximum transmit opportunity length.

The determined length of the time period must be less than a percentage of a beacon interval.

The length of the time period comprises dividing a beacon interval by a product of a number of discovered stations and a weight.

The weight equals one.

In another embodiment, an apparatus comprises a network interface device configured to determine a length of a time period corresponding to reserving a communication channel, the length of the time period exceeding the length of a beacon frame, generate a beacon frame, the beacon frame having a duration field, set the duration field to a value corresponding to the length of the time period in order to reserve the communication channel for the time period, the length of the time period exceeding the length of the beacon frame, and cause the beacon frame to be transmitted.

In other embodiments, the apparatus includes any combination of one or more of the following elements.

The determined length of the time period must be less than or equal to a maximum transmit opportunity length.

The determined length of the time period must be less than a percentage of a beacon interval.

The network interface is configured to determining the length of the time period comprises at least by dividing a beacon interval by a product of a number of discovered stations and a weight.

The weight equals one.

In another embodiment, a method for transmitting network information for a wireless network includes receiving, at an access point device, a probe request that includes an identifier of a station; generating, at the access point device, a probe response addressed to the station, the probe response being in response to the probe request; transmitting, with the access point device, the probe response; and in response to determining that an acknowledgment of the probe response has not been received from the station, retransmitting the probe response.

In other embodiments, the method includes any combination of one or more of the following elements.

The probe request comprises a null data packet (NDP).

The method further comprises determining a backoff time period; wherein the probe response is retransmitted after the backoff time period.

The identifier of the station is included in a signal field of a physical layer (PHY) header.

In another embodiment, an apparatus comprises a network interface configured to receive a probe request having an identifier of a station, generate, in response to the probe request, a probe response addressed to the station, transmit the probe response, and in response to determining that an acknowledgment of the probe response has not been received from the station, retransmitting the probe response.

In other embodiments, the apparatus includes any combination of one or more of the following elements.

The probe request comprises a null data packet (NDP).

The network interface is configured to determine a backoff time period, and retransmit the probe response after the backoff time period.

The identifier of the station is included in a signal field of a physical layer (PHY) header.

In another embodiment, a method for receiving network information for a wireless network includes generating, at a communication device, a probe request that includes an identifier of the communication device; transmitting, with the communication device, the probe request to an access point; receiving, at the communication device, a probe response addressed to the communication device, the probe response being in response to the probe request; transmitting, with the communication device, an acknowledgment of the probe response.

In other embodiments, the method includes any combination of one or more of the following elements.

The probe request comprises a null data packet (NDP).

The identifier of the communication device is included in a signal field of a physical layer (PHY) header of the probe request.

In another embodiment, an apparatus comprises a network interface configured to generate a probe request that includes an identifier of a communication device, transmit the probe request to an access point, receive a probe response addressed to the communication device, the probe response being in response to the probe request, and transmit an acknowledgment of the probe response to the access point.

In other embodiments, the apparatus includes any combination of one or more of the following elements.

The probe request comprises a null data packet (NDP).

The identifier of the communication device is included in a signal field of a physical layer (PHY) header of the probe request.

While the present invention has been described with reference to specific examples, which are intended to be illustrative only and not to be limiting of the invention, changes, additions and/or deletions may be made to the disclosed embodiments without departing from the scope of the claims

What is claimed is:

1. A method for transmitting network information for a wireless network, the method comprising:
    allocating, at an access point, a plurality of stations among multiple groups, the multiple groups including a first group and a second group;
    generating, at a network interface of the access point, a first beacon frame including network information for the first group;
    inserting an identifier of the first group in a physical layer (PHY) header associated with the first beacon frame;
    generating, at the network interface of the access point, a second beacon frame including network information for the second group;
    inserting an identifier of the second group in a PHY header associated with the second beacon frame;
    transmitting, using the network interface device, the first beacon frame and the PHY header associated with the first beacon frame; and
    transmitting, using the network interface device, the second beacon frame and the PHY header associated with the second beacon frame.

2. The method of claim 1, wherein:
    the identifier of the first group includes a first association identifier (AID); and
    the identifier of the second group includes a second AID.

3. The method of claim 1, further comprising:
    receiving, at the access point, an association request from an unassociated station, the association request including an indicator of a preference for group assignment; and
    assigning, at the access point, the unassociated station to one of the groups in the multiple groups based on the preference for group assignment.

4. An apparatus, comprising:
    a network interface device having one or more integrated circuits configured to
        allocate a plurality of stations among multiple groups, the multiple groups including a first group and a second group,
        generate a first beacon frame including network information for the first group,
        insert an identifier of the first group in a physical layer (PHY) header associated with the first beacon frame,
        generate a second beacon frame including network information for the second group;
        insert an identifier of the second group in a PHY header associated with the second beacon frame,
        cause the first beacon frame and the PHY header associated with the first beacon frame to be transmitted, and
        cause the second beacon frame and the PHY header associated with the second beacon frame to be transmitted.

5. The apparatus of claim 4, wherein:
    the identifier of the first group includes a first association identifier (AID); and
    the identifier of the second group includes a second AID.

6. The apparatus of claim 4, wherein the one or more integrated circuits are configured to:
    receive an association request from an unassociated station, the association request including an indicator of a preference for group assignment, and
    assign an unassociated station to one of the groups in the multiple groups based on the preference for group assignment.

7. A method for receiving network information for a wireless network, the method comprising:
    receiving, at a communication device, a plurality of beacon frames, each beacon frame addressed to a respective group of stations, wherein each beacon frame has an associated respective physical layer (PHY) header having a respective group identifier, and wherein the plurality of beacon frames have been transmitted by an access point;
    determining, at the communication device, a preferred group, wherein determining the preferred group is based on reception of the plurality of beacon frames;

generating, at the communication device, an association request that includes an indication of the preferred group;

transmitting, with the communication device, the association request to the access point; and receiving, at the communication device, a response to the association request, the response indicating an assignment, by the access point, of the communication device to one of the groups.

8. The method of claim 7, further comprising:

transmitting, with the communication device, one or more probe request frames, each probe request frame corresponding to a respective group of stations; and receiving, at the communication device, one or more group-based probe response frames responsive to the one or more probe request frames, wherein each of the one or more group-based probe response frames includes an indicator of a group to which the group-based probe response frame corresponds;

wherein determining the preferred group is further based on reception of the one or more group-based probe response frames.

9. The method of claim 7, wherein each group identifier comprises an association identifier (AID).

10. An apparatus, comprising:

a network interface having one or more integrated circuits configured to:

receive a plurality of beacon frames, each beacon frame addressed to a respective group of stations, wherein each beacon frame has an associated respective physical layer (PHY) header having a respective group identifier, and wherein the plurality of beacon frames have been transmitted by an access point, determine a preferred group, wherein determining the preferred group is based on reception of the plurality of beacon frames, generate an association request that includes an indication of the preferred group, transmit the association request to the access point, and receive a response to the association request, the response indicating an assignment, by the access point, of the communication device to one of the groups.

11. The apparatus of claim 10, wherein the one or more integrated circuits are configured to:

transmit one or more probe request frames, each probe request frame corresponding to a respective group of stations, and receive one or more group-based probe response frames responsive to the one or more probe request frames, wherein each of the one or more group-based probe response frames includes an indicator of a group to which the group-based probe response frame corresponds, determine the preferred group further based on reception of the one or more group-based probe response frames.

12. The method of claim 10, wherein each group identifier comprises an association identifier (AID).

* * * * *